United States Patent [19]

Armstrong et al.

[11] 4,145,692
[45] Mar. 20, 1979

[54] RADAR PERFORMANCE MONITOR

[75] Inventors: David G. Armstrong, Sudbury; William J. Bickford, Weston; Ronald K. VanderKruik, Arlington; John T. Zimmer, Harvard, all of Mass.

[73] Assignee: Raytheon Company, Lexington, Mass.

[21] Appl. No.: 776,080

[22] Filed: Mar. 9, 1977

[51] Int. Cl.² ........................... G01S 7/22; G01S 7/40
[52] U.S. Cl. .................................. 343/17.7; 343/5 EM
[58] Field of Search .................... 343/17.7 (U.S. only), 343/5 EM; 35/10.4 (U.S. only)

[56] References Cited

U.S. PATENT DOCUMENTS

| | | | |
|---|---|---|---|
| 2,549,385 | 4/1951 | Rapuano | 343/17.7 X |
| 2,942,257 | 6/1960 | Huntington | 343/17.7 |
| 3,024,461 | 3/1962 | Hollis, Jr. | 343/17.7 |
| 3,185,985 | 5/1965 | Child et al. | 343/17.7 |
| 3,199,107 | 8/1965 | Mills | 343/17.7 |
| 3,646,557 | 2/1972 | Scheer | 343/5 EM X |
| 3,772,700 | 11/1973 | Belli | 343/17.7 |
| 3,774,206 | 11/1973 | Rauch | 343/17.7 X |
| 3,792,475 | 2/1974 | Smetana | 343/17.7 |
| 3,890,616 | 6/1975 | Kojima et al. | 343/5 EM X |
| 4,017,856 | 4/1977 | Wiegand | 343/17.7 X |

Primary Examiner—Malcolm F. Hubler
Attorney, Agent, or Firm—H. W. Arnold; M. D. Bartlett; J. D. Pannone

[57] ABSTRACT

A performance monitor for use with marine radars which produces a visual indication upon the radar display screen only when the radar transmitter power, and the radar receiver sensitivity and tuning are within predetermined limits. An RF sample of the radar transmitted signal is mixed with a local oscillator signal and the resulting IF signal is coupled to an AFC loop which controls the frequency of the local oscillator. If the amplitude of the radar transmitted signal is above a threshold level, a single frequency response signal of fixed power is generated by the performance monitor and transmitted back to the radar antenna. A distinctive test pattern is produced upon the radar display if the radar receiver tuning is accurate and its sensitivity is sufficiently high.

10 Claims, 19 Drawing Figures

RADAR SYSTEM, 100

FILTER PASS BANDS

DETECTOR OUTPUT

DETECTOR OUTPUTS SUMMED

OP AMP OUTPUT

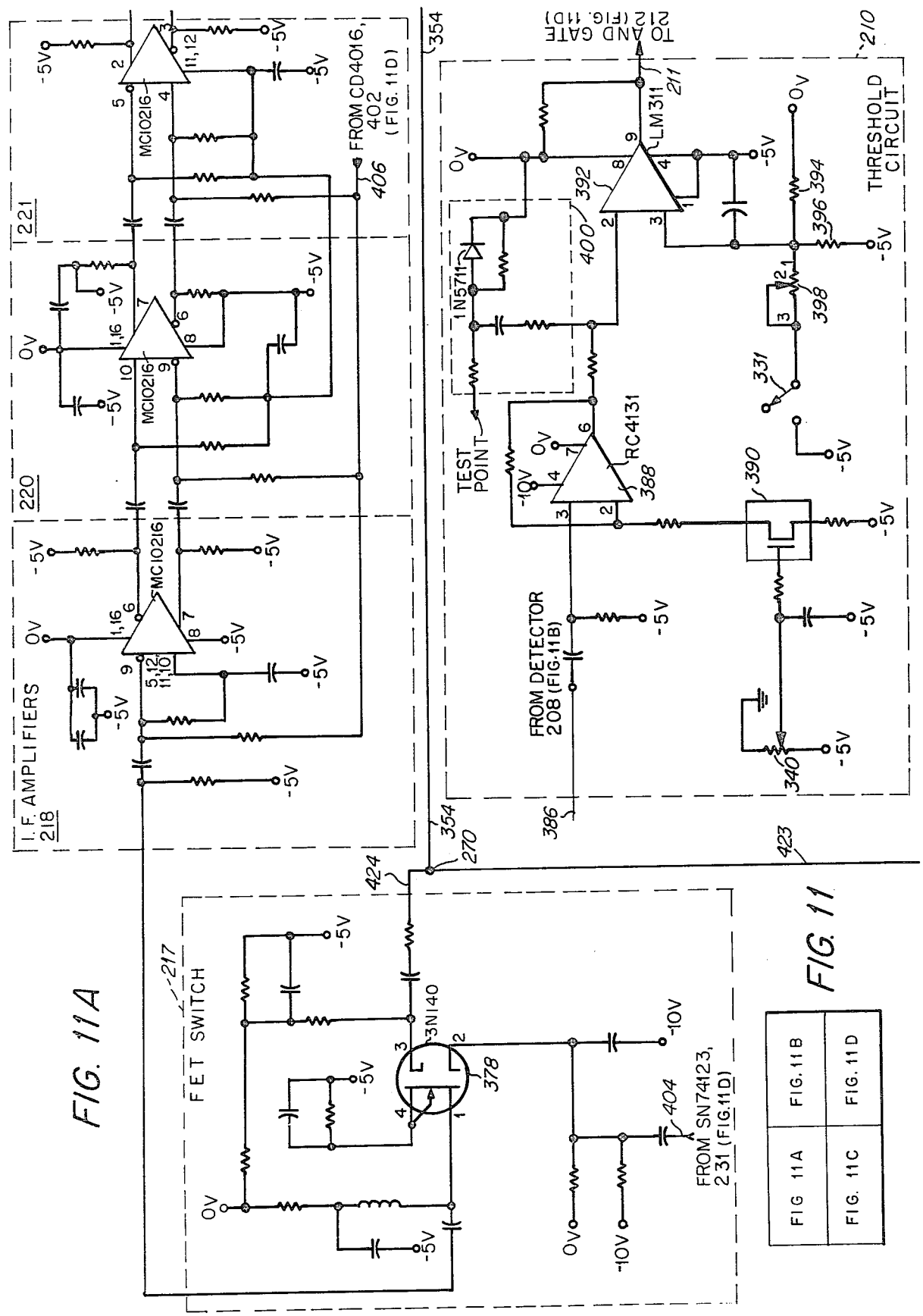

RADAR PERFORMANCE MONITOR

BACKGROUND OF THE INVENTION

This invention relates to radar performance monitors for use generally in connection with radar systems. In particular, the invention relates to a radar performance monitor that monitors radar transmitted power and receiver sensitivity and tuning in a manner which provides a distinctive pattern on the radar PPI presentation, extending out to any desired range.

It is generally not difficult to determine whether a landbased radar is operating properly or not; there are small fixed targets whose appearance on the display is known and remembered, and if they fade or disappear, the radar is losing sensitivity or malfunctioning. Marine radars, on the other hand, are generally used far out at sea where there may normally be no targets, and a partial or complete loss of radar performance may not be apparent to the operator. It has frequently been suggested that all marine radars be equipped with some sort of performance monitor capable of detecting a degradation of performance of, for example, ten dB, and it appears that such monitors will soon become mandatory for marine radars on ships of major shipping nations. Such monitors are particularly useful with the kind of radar which performs automatic tracking and can operate in a "night watch" mode in which it is unattended by an operator; if the radar detects and tracks an object which may be on a collision course, an alarm is sounded. Obviously, the sue of the "night watch" mode would be hazardous unless there were a means of alerting the operator to any radar degradation which could jeopardize reliable operation in this mode.

A device frequently used for monitoring radar performance has been the echo box which is generally expensive and not very satisfactory. It usually requires direct coupling into the radar's RF transmission line. It is limited in the range at which it can produce a response on the radar's PPI. It commonly requires a mechanical, motor-driven, tuning device.

In one aspect, the invention includes the use of a broad band radar test signal which, when returned to the radar under test, places a recognizable test pattern on the radar display device, such as a Plan Position Indicator (PPI), this test pattern being used in monitoring the radar's transmitter power level and receiver sensitivity. However, a performance monitor does not test for proper tuning of the radar receiver. An important improvement disclosed herein provides a performance monitor which is also capable of providing a test for proper tuning of the receiver to the transmitter frequency and can, therefore, be used as an aid in tuning the radar receiver when the receiver is manually tunable.

It is accordingly, an object of the invention to provide a novel and commercially acceptable radar performance monitor which responds to provide a distinctive test pattern on the display of the associated radar, which pattern disappears when the presence of radar system problems reduces the performance by a specified amount, such as ten dB.

It is another object of the invention to provide an improved radar performance monitor which responds to provide a distinctive test pattern when the radar receiver is properly tuned to the frequency of the radar transmitter.

It is a further object of the invention to provide a simple and inexpensive method of providing a clear signal that can be used as an aid in tuning the radar's local oscillator.

It is another object of the invention to provide a radar performance monitor which can be produced without modification for operating within either of the two frequency bands which are used for marine radars, namely, 2900-3100 MHz and 9300-9500 MHz.

SUMMARY OF THE INVENTION

These, as well as other objects of the invention, are met by providing a novel performance monitoring transponder which operates as an active target, used in conjunction with a radar system which includes a display, such as a Plan Position Indicator (PPI), which produces a visual indication upon a display screen of signals received by the radar from real targets and from the performance monitoring transponder. The signals produced by the performance monitoring transponder form a distinctive and readily recognizable pattern on the PPI; this pattern appears only if the radar's transmitter power and receiver sensitivity and tuning are within predetermined limits. When no real targets are present, as for example, when far at sea, the performance monitor signals provide an accurate indication of adequate and safe radar operation, not heretofore available, and permit those radars which use manual tuning to be tuned in the absence of targets. When used with those radars which have provisions for automatic tracking and, in some cases, an unattended "night watch" mode of operation, the performance monitor signals provide for automatic monitoring of radar performance, as well as, or in place of, producing a visual indication on a display screen.

In the use of the monitor, an RF sample of the radar's transmitted signal, for example at S-band, couples through space to an adjacently located transponder antenna. The latter antenna picks up the radar's transmitted pulse and routes it to a detector and thence to a threshold device with means for setting the threshold level during calibration in order to permit a response to be generated only if the threshold level is exceeded by the detector output level. At the same time, a portion of the radar transmitted pulse sample is taken off through a directional coupler modified in a novel manner to be capable of operating at both S-band X-band to a mixer where it beats directly with a local oscillator signal, for example, from an S-band voltage controlled local oscillator, referred to as an S-band VCO, or, when the radar is on another frequency band, such as X-band, it beats with the third harmonic of the S-band local oscillator signal, producing in either case an intermediate frequency signal, for example, 115 MHz.

The intermediate frequency signal is amplified, limited and fed to novel discriminator means, to be described, whose output is fed back by way of a direct current amplifier to control the local oscillator frequency. The novel discriminator has a steep cross over at 115 MHz with both positive and negative skirts which extend far enough to permit the intermediate frequency to be pulled in from the limits corresponding to the radar magnetron frequency tolerances without requiring a sweep circuit to search and lock on the radar signal. A sample of the IF signal is routed through bandpass filter means to an "On-Frequency" detector, to be described, which produces a control output which permits pedestal generator means to initiate a response only when the intermediate frequency from the mixer is near to the desired frequency, for example 115 MHz.

The pedestal generator means then produces a signal of, for example, approximately 244 microseconds duration to turn on a square wave or switching waveform generator means. The output of the square wave or bar generator means turns an IF oscillator on and off for alternating intervals, such as 6.1 microseconds. The output of the IF oscillator output is amplified and coupled to the mixer's IF input-output terminal to mix with the aforementioned local oscillator signal to produce at the antenna by way of the directional coupler, a sideband signal at the frequency of the radar transmitter. The antenna on the associated radar system picks up this signal and when the radar receiver is sufficiently sensitive and properly tuned, this signal produces a visible bar-shaped response within a wedge-shaped area on the radar's PPI, this wedge-shaped area being within azimuth limits corresponding to the near field pattern of the rotating radar antenna. The pattern of the radar performance monitor response is displayed as bright arcs or bars on the PPI extending through approximately half-mile range intervals with half-mile spaces between them, corresponding to the output of the switching waveform generator. These arcs on the PPI extend out to a distance, for example twenty miles, which is slightly less than the minimum range which would permit second-time-around responses, this distance being determined by the length of the aforementioned pedestal, for example 244 microseconds, corresponding to the maximum repetition rate of the associated radar, for example 3600 pulses per second. It should be understood that, in order for the radar performance monitor's response signal to be at the radar transmitter frequency, the IF oscillator must be at substantially the same frequency as the discriminator crossover. The frequency determining elements of these circuits and of the aforementioned "On-Frequency" filter have been preferably selected so that they track each other with changes in temperature.

In a further improvement, the invention utilizes a novel discriminator, as mentioned previously, in its automatic frequency control (AFC) circuitry which permits a single radio frequency source within the monitor to respond at the same frequency as the radar's transmitter by providing a wide pull-in range and stable locking. This avoids the necessity of using a sweep circuit to search and lock on the radar signal. This advantage is achieved by amplifying and limiting the IF signal at 115 MHz, for example, from the mixer by means of a limiting amplifier having dual outputs, each of which is coupled to a single-tuned filter of differing center frequencies and passbands which overlap at the aforementioned 115 MHz, for example. Opposite polarity detectors are connected to the two filters and their outputs are summed and amplified using low Q single-tuned circuits which produce a large voltage to frequency ratio at the crossover frequency which is determined by the overlap of the two filters. The overall bandwidth is determined by the filter bandwidths. This provides a crossover frequency which is stable with IF input power levels of, for example, −20 dBm to zero dBm with relatively small frequency change.

In its broader aspects, the invention contemplates a radar performance monitor for use with marine radars which produces a visual indication upon the radar display screen only when the radar's transmitted power and receiver sensitivity and tuning are within predetermined limits. A sample of the RF transmitted signal, coupled through a directional coupler to a mixer, is mixed with a signal from a local oscillator having its frequency controlled by an AFC loop. When the RF sample has sufficient amplitude, a response signal of fixed power is generated by mixing a signal from an IF oscillator with the signal from the RF local oscillator in the mixer. When this response signal is at the frequency of the radar transmitter, as determined by the "On-Frequency" detector, the response is transmitted by way of the directional coupler back to the performance monitor antenna and through space to the radar antenna. When this response signal from the monitor is received by the radar antenna, the radar antenna being directed so as to couple to the monitor antenna, a test pattern is produced upon the display of the radar receiver provided that the receiver is correctly tuned and its sensitivity is sufficiently high.

A further novel feature of the invention is that the microwave components, namely, the directional coupler, the mixer, and the detector, are adapted to operate without structural modification at both S-band and X-band by taking advantage of the fact that the operative quarter wavelength dimensions at S-band are an odd number of quarter wavelengths at X-band, namely, three quarter-wavelengths.

The invention also contemplates use of the performance monitor with other transmitted signals such as from buoys, land-based transmitters and other transmission systems with which an associated display can be used to indicate performance of such systems.

BRIEF DESCRIPTION OF THE DRAWINGS

FIG. 5 shows the performance monitor response pattern appearing on the radar PPI;

FIGS. 11A, 11B, 11C and 11D are schematic diagrams showing the performance monitor in greater detail, FIG. 11 being a block diagram showing the relative position of the above FIGS. 11A, 11B, 11C and 11D.

DESCRIPTION OF THE PREFERRED EMBODIMENT

Figure 1:
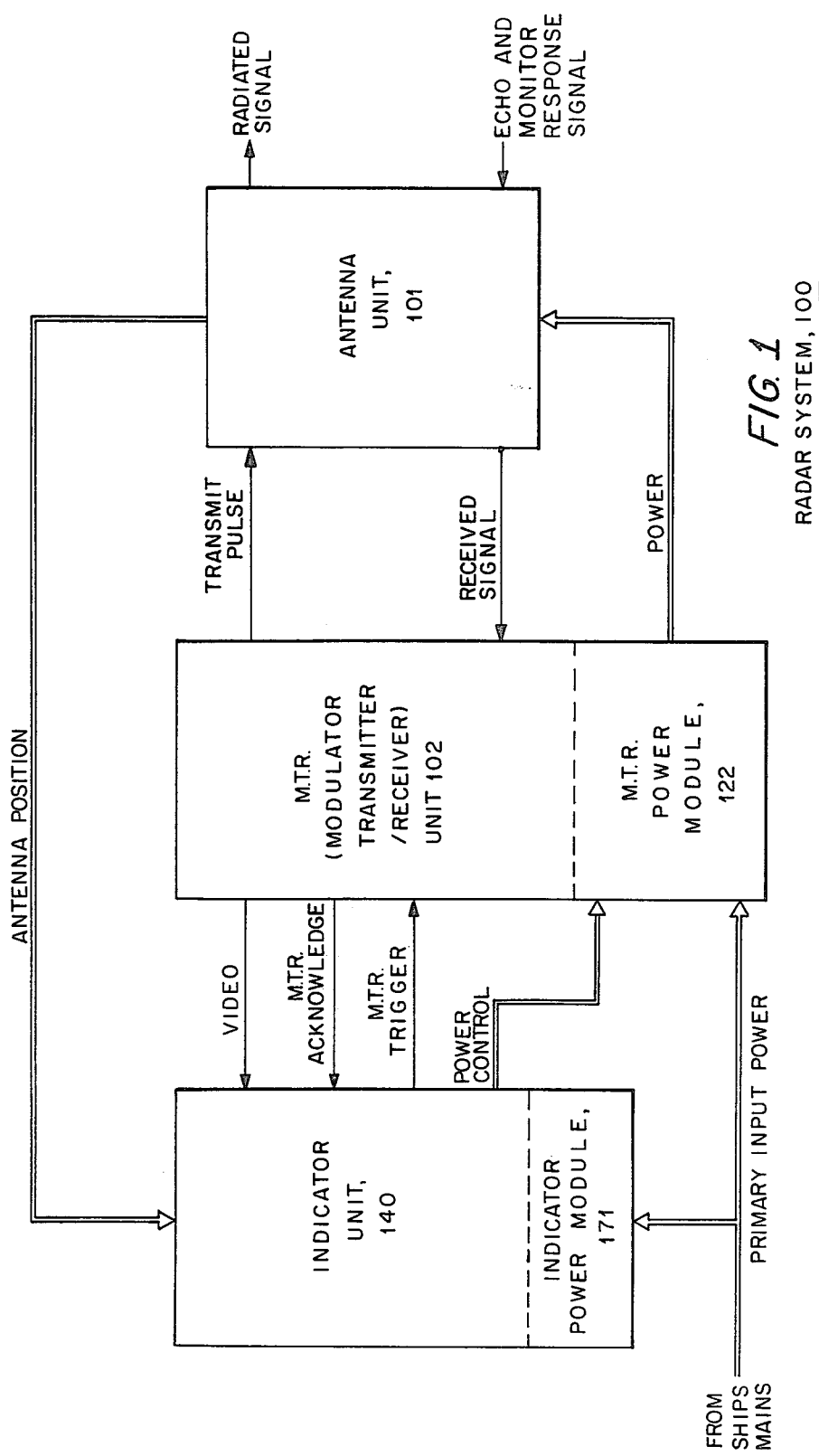
FIG. 1 is a basic block diagram of a radar system for use with the radar performance monitor of the invention.

Referring first to FIG. 1, there is shown a basic black diagram of a radar system used in connection with the radar performance monitor of the present invention. The radar system is constructed from three basic units: indicator unit 140, MTR (modulator-transmitter-receiver) unit 102, and antenna unit 101. Indicator unit 140, which provides the display of radar information and contains the operating controls of the system, is ordinarily mounted upon the bridge of the ship for easy access and convenience for use in navigation. Antenna unit 101 is in practice mounted as high as possible with an unobstructed path for the antenna beam to maximize the range of the unit. MTR unit 102 is located in weather-tight position as close as is practical to antenna unit 101 to minimize losses in the high-power transmit pulses coupled to antenna unit 101 and the low-level receive signals coupled from antenna unit 101 to MTR unit 102.

Indicator unit 140 and MTR unit 102 contain separate power modules 171 and 122 respectively. Both take the ship's power which may be 110 volts AC 60 cycles or primary input power from any other normally provided source and convert it to DC voltages suitable for operating the various electronic circuits and electromechanical devices located within the two units. Additionally, MTR power module 122 supplies operating power to antenna unit 101 to the motor contained therein for rotation of the antenna. By providing separate power modules in each of the two remotely located major operating units, losses which occurred in previous units in the cabling between units is avoided. Moreover, with the present system, ON/OFF control of MTR power module 122 is accomplished from indicator unit 140 using only low signal level control voltages. Full control is therefore maintained at the indicator unit without large amounts of power dissipation and loss in long runs of cabling between units.

Each radar pulse cycle is initiated at indicator unit 140 by the production of an MTR TRIGGER pulse which is coupled to MTR unit 102. Upon receipt of this pulse, MTR unit 102 produces a high-power transmit pulse. The transmit pulse is coupled to antenna unit 101 which radiates the signal outward in a narrow beam. Echo return signals from targets are received at antenna unit 101 and relayed to the receiver portion of MTR unit 102. The receiver portion of MTR unit 101 amplifies and detects the received echo signals and produces a video signal to indicator unit 140. The commencement of the video signal is marked by an acknowledge pulse generated within MTR unit 102. Indicator unit 140 produces a visual display of the signals reflected back from targets in the path of the radar beam in accordance with the video signal. The azimuthal position of the radar antenna is relayed from antenna unit 101 directly to indicator unit 140 to indicate the angle upon the display screen at which the returned radar signals are to be displayed.

Figure 2:
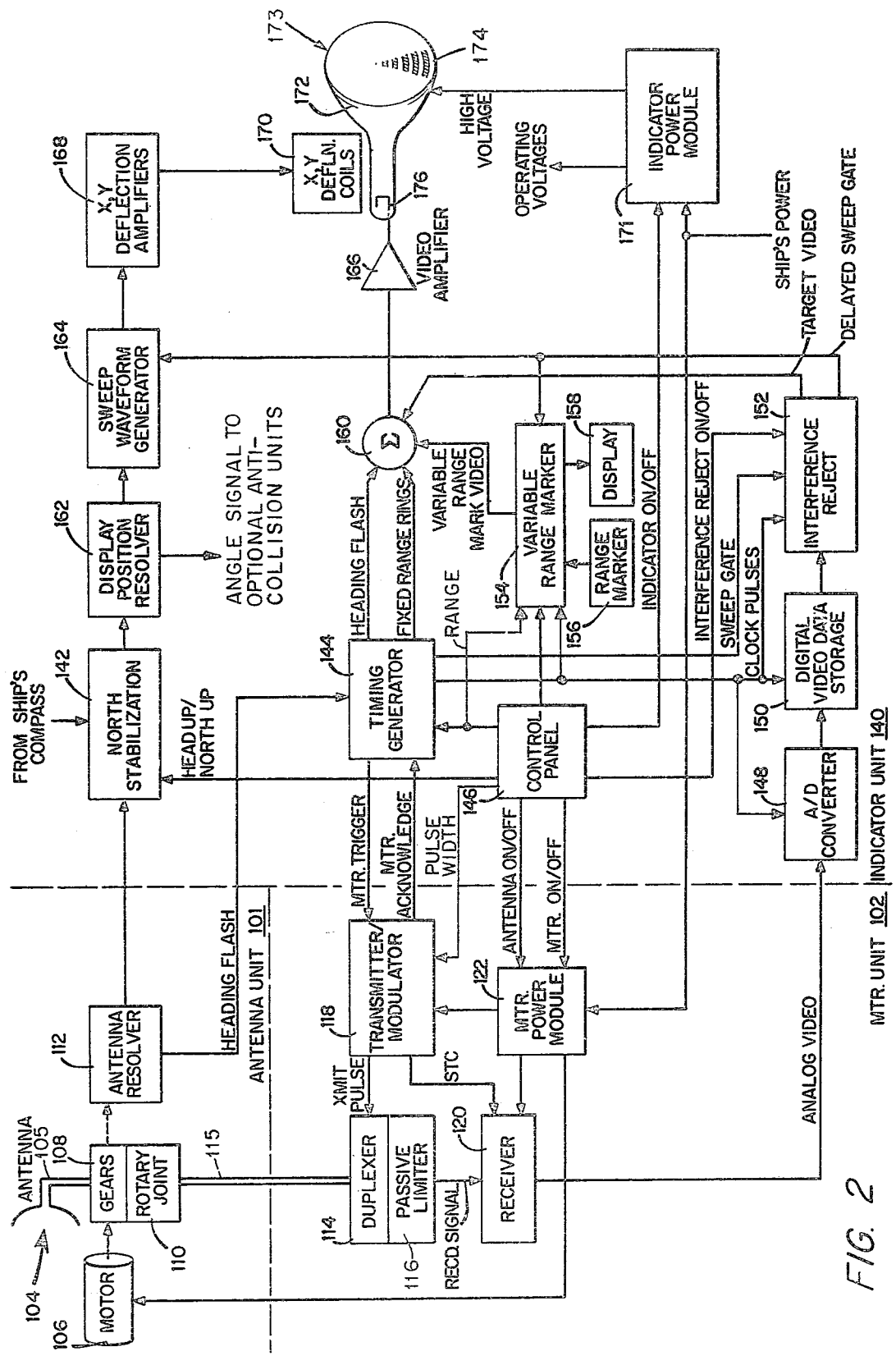
FIG. 2 is a detailed block diagram of a radar system for use with the performance monitor of the invention.

Referring next to FIG. 2, there is shown a detailed block diagram of radar system 100 as shown in FIG. 1. Antenna unit 101 contains a rotatable antenna 104 capable of radiating and receiving signals within the frequency range of the radar pulses. Antenna 104 is rotatably connected to a set of gears 108 through a section of waveguide 105. Motor 106 is mechanically linked to antenna 104 through gears 108 and causes antenna 104 to rotate at a substantially constant and predetermined rate. Antenna resolver 112 is also linked through its input rotary shaft to gears 108 and antenna 104. Its input shaft is rotated preferably at the same rate as antenna 104.

Signals going to and coming from antenna 104 are coupled through rotary joint 110 within antenna unit 101 through waveguide section 115 to duplexer 114. Receive signals are passed through duplexer 114 and passive limiter 116 to the input of receiver 120. Duplexer 114 isolates the transmit pulses produced by transmitter-modulator 118 from receiver 120 and couples the receive signals directly from waveguide 115 to the input of receiver 120 without substantial loss. Passive limiter 116 provides an absolute amplitude limit upon input signals to protect the input circuitry of receiver 120 from being overloaded from signals picked up from nearby radar transmitters.

Transmitter-modulator 118 produces radar pulses in response to an input trigger signal from timing generator 144 within indicator unit 140. The PRF (pulse repetition frequency) of the transmitted radar pulses is entirely determined by the repetition rate of the MTR trigger signal produced by timing generator 144. In previous radar systems in which the PRF was a function of the radar range setting, a plurality of signals indicative of the various possible range settings was coupled to the transmitter-modulator. A decoding circuit then determined the appropriate PRF for the range chosen. With the present system, however, only a single trigger signal need be provided.

The width of pulses transmitted may also be a function of the radar range scale setting. It may, for example, be desirable to use a narrower pulse on shorter range scales in order to obtain a greater definition than would be possible using the longer pulses necessary to achieve an acceptable signal-to-noise ratio on the longer ranges. However, it has been found not necessary to provide a different pulse width for every possible range setting value. For example, in the preferred system embodiment of the invention, there are ten different range settings between 0.25 and 64 nautical miles. It has been found that only three different pulse widths of approximately 60, 500, and 1000 nanoseconds are practically required. Only a two-bit digital signal then need be coupled between timing generator 144 and transmitter-modulator 118 to select among the three pulse widths. As there are many fewer pulse widths required than are range scale values selectable, many fewer lines or signals need be passed between timing generator 144 and transmitter-modulator 118 than were needed in previous systems.

In previous systems a trigger pulse was generated within the MTR which was coupled to both the modulator and display circuitry. Because of certain characteristics of the most commonly employed modulators, the delay time between application of a trigger pulse and generation of the actual transmitted pulse may vary. This is especially true between ranges. Because of this unpredictable delay difference, targets in previously known radar systems would sometimes be displayed having an inaccurate jagged edge caused by the sweep starting either too early or too late. With the system constructed for operation with the present invention, this problem has been eliminated.

Transmitter-modulator 118 produces an MTR ACKNOWLEDGE pulse at the commencement of each transmit pulse. This MTR ACKNOWLEDGE pulse coupled to timing generator 144 marks the beginning of the start of the radar sweep for each of the video signal processing circuits within indicator unit 140. Because the MTR ACKNOWLEDGE pulse is precisely aligned with the commencement of each radar pulse, registration between adjacent sweep lines upon the display screen is maintained to a high precision. Thus, the actual shapes of targets are accurately presented with no jagged edges caused by imprecise synchronization of the start of the display sweep with the actual transmitted pulse.

Transmitter-modulator 118 also produces a sensitivity time control (STC) signal to control the gain with receiver 120. As is well known in the art, the STC signal is used to vary the gain of receiver 120 during each radar interpulse interval. For signals received from targets nearby, the gain is reduced. In this manner the amplifying circuitry within receiver 120 is prevented from being overloaded by the strong signals from nearby targets and locally caused interference, and a display having a substantially constant brilliance is produced.

The analog video signal produced at the output of receiver 120 is converted to a serial stream of digital data by analog/digital converter 148 within indicator unit 140. The rate at which samples are taken of the analog video signal for digitization and the length of the time period from the start of the radar pulse during which the analog video signal is digitized are dependent upon the radar range scale setting. For the shorter ranges, a higher sampling rate and shorter time period are used.

The digitized video signal is read into digital video data storage memory 150 under control of clock pulses from timing generator 144. Digital video data storage memory 150 stores the digitized video signal from an entire radar interpulse interval. The range to which the signal is stored is, of course, dependent on the range scale setting. The digital video signal is read out of digital video data storage memory 150 for display upon cathode-ray tube 172 in a second time period also determined by the rate of clock pulses coming from timing generator 144. The second time period may be greater than or less than or the same as the first time period during which the video signal was read into digital video data storage memory 150. Readout occurs preferably immediately following the first time period and before commencement of the next succeeding radar time period. In preferred embodiments, the second time period is substantially constant and independent of the first time period. In this manner, with the constant readout time period, the writing or deflection rate of the beam of cathode-ray tube 172 is also constant so that the display produced is of constant intensity independent of the radar range scale setting. For short ranges, the second time period during which the digital signals are read out from digital video data storage memory 150 and displayed is substantially greater than the time period during which the signals were read in. Because of the increase in time period, the writing rate of the beam of the cathode-ray tube 172 is decreased over that which would be required should the video signal to displayed at the same rate at which it is received. Hence, the brightness of the display upon short ranges is greatly increased over that of previously known systems. The preferred manner of video signal digitization, storage, and readout is described in copending United States application Ser. No. 755,320 filed Dec. 29, 1976, now U.S. Pat. No. 4,107,673 which is a continuation of Ser. No. 612,882 filed Sept. 12, 1975, (now abandoned) which is a continuation of application Ser. No. 413,130 filed Nov. 5, 1973 (now abandoned), assigned to the present assignee, and which is hereby incorporated herein by reference.

Interference rejection circuit 152 is provided to nullify the interference effects caused by nearby radar transmitters operating within the same frequency band. This type of interference, caused by reception of the transmitted pulses from the nearby radar, appears as plural spiral arms radiating outward from the center of the radar presentation. Interference rejection circuit 152 operates to substantially cancel this type of inteference from the radar presentation without substantially affecting the presentation of desired targets. A switch is located upon control panel 146 which permits the operator to turn interference circuit 152 ON and OFF as desired. The final video output signal produced at the output of interference rejection circuit 152 is coupled to video amplifier 166 via video signal summer 160.

Also provided is variable range marker circuit 154. Variable range marker circuit 154 produces an output video signal in the form of a short pulse for each sweep to display a circular range ring mark at a distance from the center of the radar display determined by the setting of range marker adjustment 156. Range marker adjustment 156 may physically be a part of control panel 146. A display device 158 provides a digital readout to the target upon which the variable range mark is positioned. The output variable range mark video signal from variable range mark circuit 154 is coupled to video amplifier 166 through video signal summer 160.

Timing generator 144 furnishes clock and other timing signals used for the various circuits within indicator unit 140. An internal oscillator within timing generator 144 produces the clock pulses at predetermined periods. The heading flash from antenna resolver 112 which is produced each time the antenna beam passes the forward direction of the ship is reclocked by the clock pulses produced by the oscillator within timing generator 144 and coupled as a video pulse through video signal summer 160 to video amplifier 166 to produce a mark on the screen to indicate to the operator when the antenna beam so passes the bow of the ship. Timing generator 144 also produces the MTR TRIGGER signal as a pulse at predetermined fixed intervals depending upon the radar range scale setting as relayed from control panel 146. The MTR ACKNOWLEDGE signal from transmitter-modulator 118 is used by timing generator 144 to produce a SWEEP GATE signal which is a logic signal which assumes the high or active state in the time period during which video signals are being received. The SWEEP GATE signal is set in the active state as soon as the MTR ACKNOWLEDGE signal is received and set to the low or inactive state at the end of the time period depending upon the range setting selected.

Upon control panel 146 are mounted the various operator actuated controls for adjusting and determining the operation of the various circuits within the radar system. A range control is provided that determines the maximum range at which targets are to be displayed. This distance corresponds to the distance at the edge of the cathode-ray tube screen. ON/OFF switches are provided for operating MTR power module 122, motor 106 of antenna 101 via MTR power module 122, interference rejection circuit 152, variable range market circuit 154, and indicator power module 171. A switch is provided to select between head up (the direction in which the ship is pointing) or north up at the top of the display presentation.

For generating displays in which north rather than the current ship's heading is represented at the top of the display screen, north stabilization circuit 142 modifies the signals received from antenna resolver 112 before coupling them to display position resolver 162. Otherwise, for displays in which the ship's heading is displayed at the top of the screen, the signals from antenna resolver 112 are coupled directly to display position resolver 162. Display position resolver 162 takes the output signals from either antenna resolver 112 or north stabilization circuit 142 in the form of modulated sine and cosine waveforms and produces therefrom DC voltages for each radar sweep representing X and Y sweep increments. Sweep waveform generator 164 produces X and Y ramp waveforms, the maximum amplitudes of which are determined by the DC voltages from display position resolver 162. Generation of the two ramp waveforms commences at the time marked by the beginning of the DELAYED SWEEP GATE signal from interference rejection circuit 152 which in turn was produced by delaying the SWEEP GATE signal from timing generator 144 by one or more clock periods to permit interference rejection circuit 152 to perform its operation. The X and Y ramp waveforms are each coupled to X and Y deflection amplifiers 168 where they are amplified and coupled to X and Y deflection coils 170 for deflecting the beam of cathode-ray tube 172 in the manner well known in the art. The output of video amplifier 166 is coupled to cathode 176 of cathode-ray tube 172 for modulating the beam intensity thereof.

The high voltage applied to the accelerating anode of cathode-ray tube 172 and all other operating voltages for the various circuits within indicator unit 140 including the voltages for biasing and operating all the logic circuits contained therein are provided by indicator power module 171. Indicator power module 171 is, as is MTR power module 122, preferably a switching power supply capable of producing at its output a plurality of voltages having the required current furnishing capabilities. The switching frequency of indicator power module 171 and that of MTR power module 122 are selected intermediate the PRF rate as determined by timing generator 144 in accordance with the range setting and the rate of digitization of the analog video signal by analog/digital converter 148. By operating the power modules at a switching rate intermediate the PRF and digitization rates, interference effects are eliminated.

Figure 3:
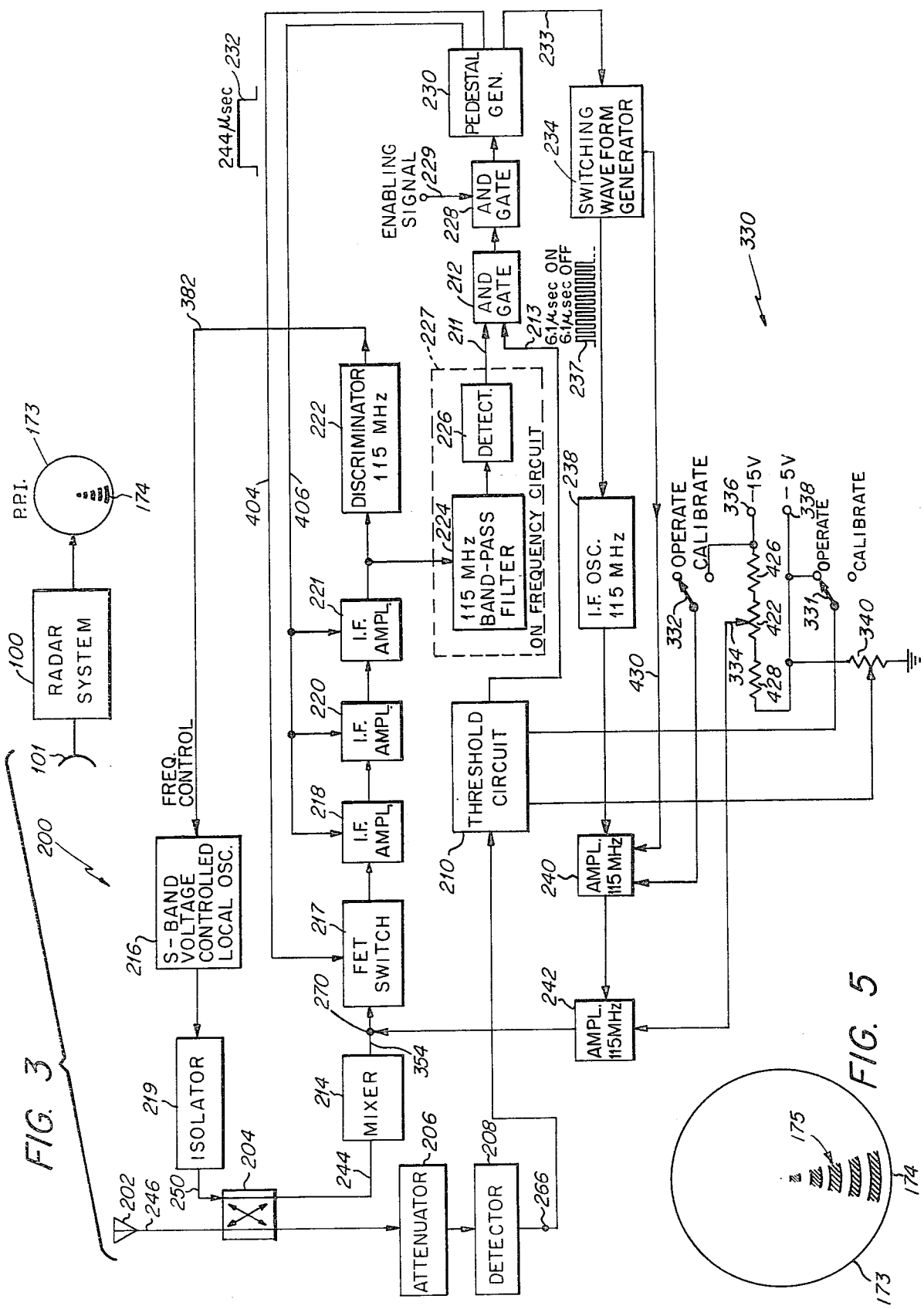
FIG. 3 is a block diagram of the performance monitor circuit for use with a radar system such as shown in FIG. 2.
Figure 4:
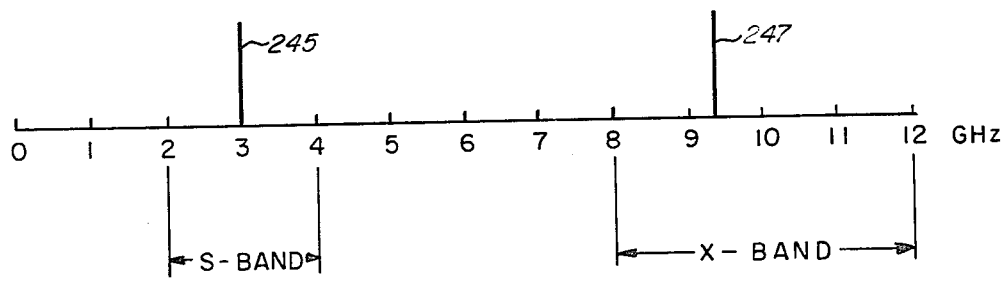
FIG. 4 is a frequency chart showing the performance monitor response signals for S-band and X-band.

Referring now to FIGS. 3 and 5, there is shown the radar system 100, which can be aboard a ship, with the cathode-ray tube 172 of FIG. 2 showing a display screen 173 on which is displayed a wedge-shaped pattern 174 appearing in response to a signal from an active target herein shown as a performance monitor 200 of FIG. 3. Radar antenna 101 transmits a series of pulses into space. Antenna 202 of the performance monitor is located so as to receive a sample of those transmitted pulses; in this embodiment, the performance monitor is generally attached directly to the radar antenna support structure. The pulse samples, which may be at S-band or at X-band as shown in FIG. 4, are coupled through the main arm of a directional coupler 204 and an attenuator 206 to a detector 208, the attenuator being used to reduce the level of the incoming signal so as not to overload the detector and to avoid undesirable interaction between detector 208 and directional coupler 204. Directional coupler 204, attenuator 206, and detector 208 are adapted to operation in both of the frequency bands used for marine radars, namely, S-band and X-band, as will be described later. However, it should be understood that these three components can be single-band devices adapted to operate only at S-band or only at X-band, in which case separate performance monitors are used for operation with radars at the respective frequency bands. The output of detector 208 is connected to threshold circuit 210 which is used to compare the output of the detector with a source of reference voltage, within the threshold circuit, which must be exceeded to generate a control signal to AND gate 212 which is used to enable the performance monitor to produce a response signal. Directional coupler 204 also couples a portion of the input signal at antenna 202 to a mixer 214, which is adapted to operate at either S-band or X-band, where it is mixed with an S-band signal from a well-known voltage controlled local oscillator 216, when the associated radar 100 is at S-band, or with the third harmonic of the signal from the local oscillator 216, when the associated radar 100 is at X-band, this third harmonic being generated in the mixer 214. The output of the local oscillator 216 is coupled to the mixer 214 by way of an isolator 219 and the directional coupler 204. Isolator 219 isolates the output of the oscillator 216 from impedance mismatch of the mixer 214 while the coupler 204 provides a direct path to the mixer 214. The output from mixer 214 is an IF signal. This signal is coupled through an FET switch 217, which is inherently capable of operation at IF and of providing rapid switching into and out of a state of high attenuation. The IF signal is amplified in amplifiers 218, 220 and 221 and is acted upon by a novel discriminator 222 which has two low-Q single-tuned filters followed by positive and negative detectors, the outputs of which are summed and fed to an operational amplifier, producing a voltage-frequency characteristic which has a steep crossover at 115 megacycles, corresponding to a large voltage-frequency ratio, and which has positive and negative skirts extending far enough to permit the IF to be pulled in from the limits of the radar magnetron frequency specifications without requiring a sweep circuit to search and lock. The slope is determined by the gain of the operational amplifier, while the crossover frequency is determined by the overlap of the passbands of the filters in the discriminator. The IF is pulled in and the AFC loop is locked so that the IF is at the crossover frequency of the discriminator with no more than ten percent of the number of pulses available during each rotation of the radar antenna. The output of the discriminator 222 produces a DC frequency control signal to local oscillator 216 to complete an AFC loop which maintains the intermediate frequency at the discriminator crossover frequency in a known manner. A sample of the IF signal at the input of the discriminator 222 is coupled through bandpass filter 224 to detector 226 which, in combination with bandpass filter 224, forms an "On-Frequency" circuit 227, which combination operates to enable the performance monitor to produce a response signal only when the aforementioned AFC loop has brought the response frequency within the passband of the associated radar receiver and to prevent the generation of monitor responses otherwise, that is, when there is no signal output from detector 226 to AND gate 212. In the presence of a control signal from threshold circuit 210 and an output from "On-Frequency" circuit 227, the AND gate 212 produces an output which is connected to one of the two inputs to a second AND gate 228, the other input being provided by an enabling signal from the radar on lead 229, which signal is always present in normal operation. However, this enabling signal can be removed, when the associated radar is operating in an optional automatic tracking mode, in order to inhibit responses from the monitor when such responses would interfere with the operation of the radar in this mode. A signal from AND gate 212 and the enabling signal at the inputs of AND gate 228 provide a trigger signal input from AND gate 228 to a conventional pedestal generator 230 which provides an output 232 of, for example, 244 microseconds duration, corresponding to the desired duration of the monitor response signal, on lead 233 which is applied to a switching waveform generator 234. Pedestal generator 230 also produces outputs as shown at 232 on leads 404 and 406. These outputs are connected to FET switch 217 and to IF amplifiers 218, 220 and 221, respectively, and are used to perform switching and gain control functions, to be described. Switching waveform generator 234 produces an essentially square wave output 237 which is comprised of a series of, for example, 6.1 microsecond ON and OFF intervals which form bands or range rings occurring in a wedge-shaped area 174 on the PPI of the associated radar when received as a monitor response. These bands correspond to a distinctive test pattern 174 on the PPI consisting of bright arcs or rings 175 of approximately one-half mile duration separated by intervals of approximately one-half mile and continuing out to about twenty miles. Since the maximum pulse repetition rate, preferably, is 3600 cycles per second, with an interpulse interval of 22.7 miles, second time around responses are avoided. The square wave output from switching waveform generator 234 turns the IF oscillator 238 on and off, producing a corresponding train of IF output pulses at, for example, a frequency of 115 megahertz, which is substantially equal to the crossover frequency of discriminator 222 in the AFC loop. These pulses are amplified in conventional amplifiers 240 and 242, each of which receives a separate gain control signal from operate and calibrate circuitry 330 usually located near the radar. The IF output of amplifier 242 is coupled to the mixer 214 while at the same time the FET switch 217 is biased to a condition of high attenuation, and amplifiers 218, 220 and 221 are effectively disabled during the monitor response period corresponding to the output of pedestal generator 230 which applies the 244-microsecond signal 232 as switching and disabling signals on lines 404 and 406, respectively. This prevents the response signal from amplifier 242 from entering and capturing the AFC loop.

The IF output of amplifier 242 mixes in the dual frequency mixer 214 with the signal from the S-band local oscillator 216 when the associated radar is operating at S-band and with the third harmonic of the local oscillator signal, generated in the mixer 214, when the associated radar is operating at X-band. The result is an output sideband signal on lead 244 at the frequency of the radar transmitter which can be at S-band or X-band, shown in FIG. 4 as signals 245 and 247, respectively. This signal is coupled through directional coupler 204 to antenna 202 and radiated into space to be received by the radar antenna 101, processed by the radar system 100, and displayed as a distinctive response pattern 174 on the PPI face 173.

It should be understood that the dual frequency operation of the directional coupler 204, the detector 208, and the mixer 214 exploits in a novel manner the fact that the X-band frequency at which marine radars operate is related to the corresponding S-band frequency by a factor of approximately three. This permits the essential quarter wavelength dimensions of the above three microwave components, as basically dimensioned for operation at S-band, to be trimmed to be three-quarter wavelength dimensions at X-band, it being well known that these essential dimensions are an odd number of quarter wavelengths when the above three components are made to operate as described below.

Figure 6:
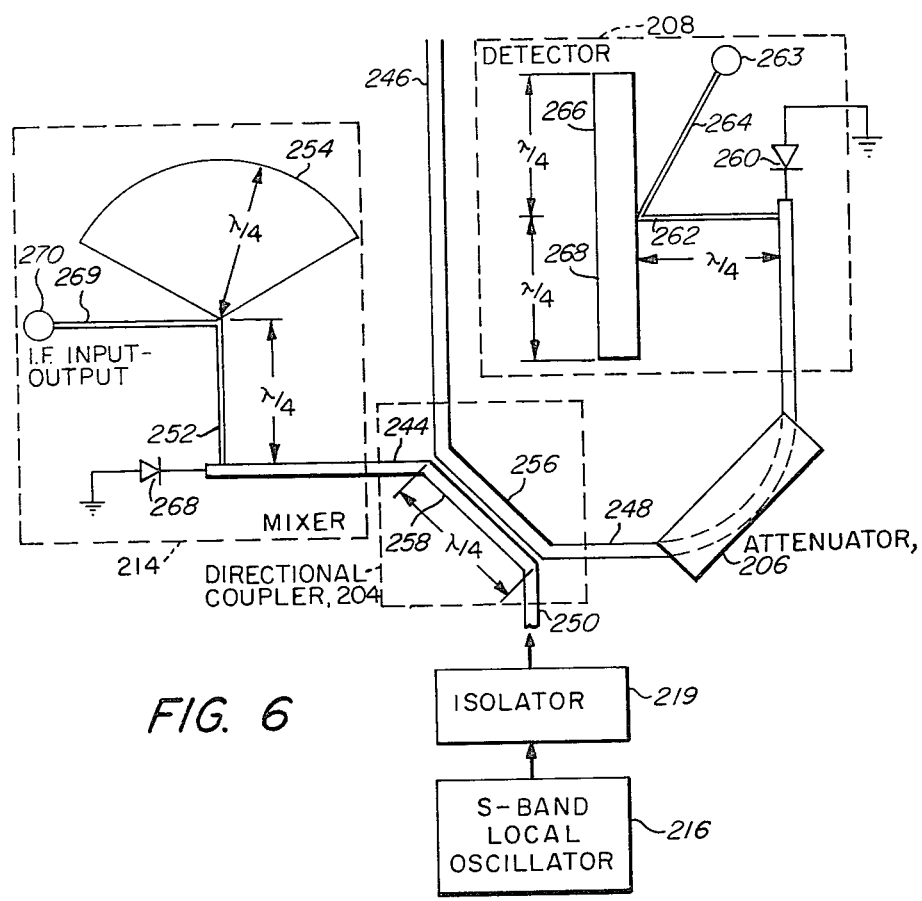
FIG. 6 is a pictorial view partially in schematic of the microwave components of the performance monitor.

Referring to FIG. 6, there is shown a pictorial view of the above three microwave components, partially in schematic, showing the essential quarter wavelength dimensions in the printed microwave circuits used in the directional coupler 204, detector 208, and mixer 214 through which they are adapted to operation over two marine bands without the necessity of performing any adjustment in the components or of providing two separate sets of corresponding components. For example, an S-band signal enters a transmission line 246 consisting of a metallic conductor separated by a dielectric sheet of essentially uniform thickness from an underlying metallic ground plane (not shown), the width of the metallic conductor being selected for a characteristic impedance of 50 ohms. Directional coupler 204 consists of two such transmission lines 256 and 258 having a coupling region with a length of an odd number of quarter wavelengths in which they are separated by a gap whose width, for example. 0.004 inch, determines the coupling of the directional coupler, for example 10 dB. The length of the coupling region is dimensioned to be one quarter-wavelength at S-band, as shown in FIG. 6, and three quarter-wavelengths at X-band, providing the advantage that the directional coupler can be used without modification over both marine radar frequency bands. The main line output of the directional coupler 248 is connected through an attenuator 206, comprising a thin sheet of dielectric material with a thin coating of absorptive material on its surface adjacent the transmission line, to a detector 208 containing a diode 260, one side of which is connected to the ground plane. The rectified output of the diode is coupled through strip transmission lines 262 and 264 to an output terminal 263. Detector transmission lines 262 and 264 are made approximately one-sixth of the width of the 50-ohm transmission line to provide a high characteristic impedance which in combination with the low characteristic impedance of the two quarter wave sections 266 and 268 provides an RF choke which prevents RF energy from being coupled to the output terminal 263 by presenting an effective open circuit at the diode 260 in a well-known manner. Since transmission lines 262, 266, and 268 are an odd number of quarter wavelengths long, they are dimensioned to have a length of one quarter-wavelength at S-band and three quarter-wavelengths at X-band, so that the RF choke performs as described above in both marine radar frequency bands.

The diode mixer 214 is fed by a 50-ohm transmission line 244 receiving a signal from the local oscillator 216 by way of S-band isolator 219, such as a well-known ferrite isolator, and also a coupled signal from transmission line 246 by way of directional coupler 204. The coupled signal in line 258 flows in a direction opposite to the direction of the signal in line 256, as is well known. These two signals mix in mixer diode 271 to produce an IF output signal. High impedance transmission lines 252 and 269 couple the IF output signal from the mixer diode 268 to the IF input-output terminal 270. Also connected at the input of diode 268 by way of high impedance transmission line 252 is a fan-shaped low impedance tapered transmission line 254, also consisting of a thin metallic conductor separated from the ground plane by the dielectric substrate and providing a quarter wave transformer which transforms the open circuit at its outer circumferential edge to an effective short circuit at the junction with transmission lines 252 and 269 to present by way of quarter wave section 252 an effective open circuit at diode 271 in a known manner. It should be understood that the RF choke consisting of transmission lines 252 and 254 and the RF choke consisting of transmission lines 262, 266,, and 268 perform essentially equivalent functions of preventing the coupling of RF energy to the DC or IF output terminals, such as 263 and 270, and could be used interchangeably as space permits. Thus, both RF chokes are similarly adapted to dual frequency operation in that both S- and X-band signals on lines 244 and 248, or generated in diode 271, are prevented from being coupled to input-output points 270 and 263.

In this manner, the directional coupler 204, detector 208, and mixer 214 are adapted to take advantage of the usually undesirable response occcurring at an odd harmonic of the fundamental S-band frequency to permit operation at X-band also without requiring the use of separate components for each of the two frequency bands.

Figure 7:
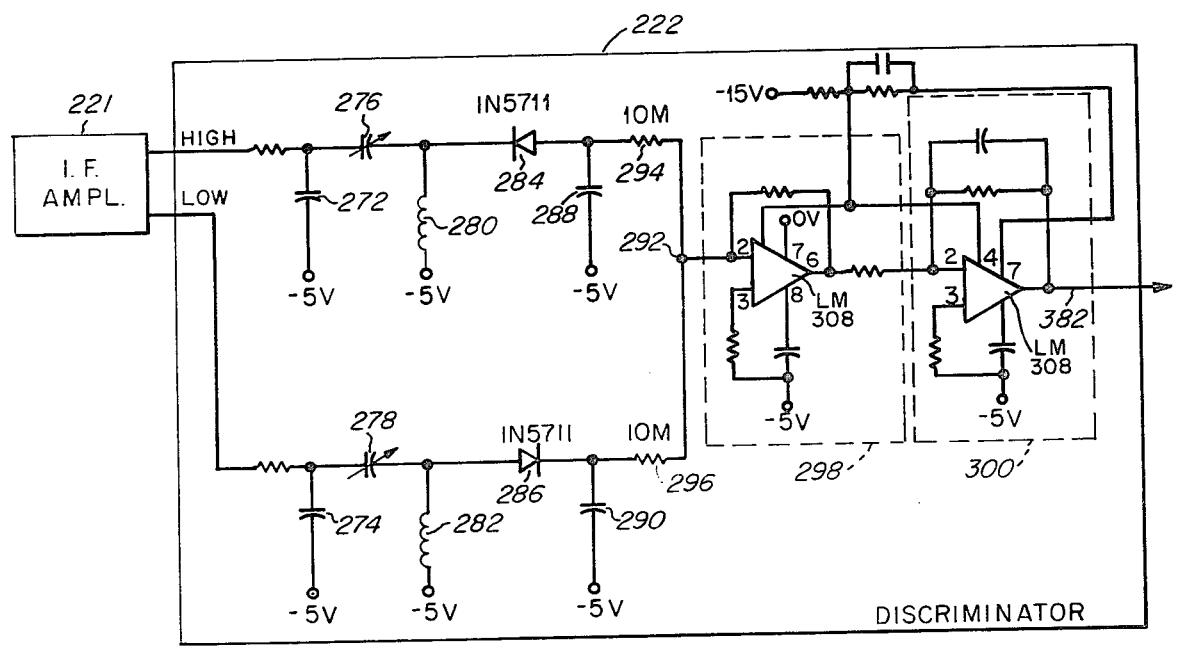
FIG. 7 is a schematic diagram of the discriminator circuit used in the performance monitor.
Figure 8A:
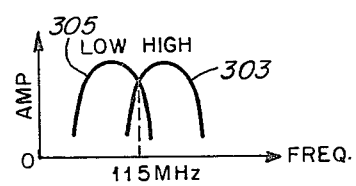
FIGS. 8A–8D are discriminator waveforms showing overlapping filter passbands detector outputs, and final output.
Figure 8B:
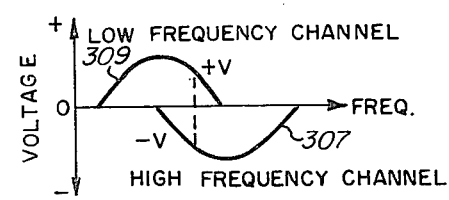
Figure 8C:
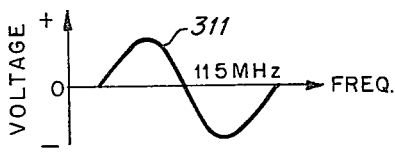

Referring now to FIG. 7, there is shown a discriminator 222 having high and low frequency bandpass filters fed by a pair of equal outputs from limiting amplifier 221. In particular, these bandpass filters include resonant circuits consisting of shunt capacitors 272 and 274, tunable series capacitors 276 and 278, and shunt inductors 280 and 282 forming high and low pass filters. The series-shunt arrangement of the capacitors 272, 276, and 274, 278 transforms the low output Impedance of the limiting amplifier 221 up to a higher value to provide a value of Q in the resonant circuits corresponding to a three dB bandwidth of approximately 20 MHz, suitable for the relatively wide range of IF input frequencies encountered before the AFC loop is locked. The high pass filter is coupled to the anode of detector diode 284 having a well-known high front-to-back resistance ratio, such as a 1N5711, poled to provide a negative DC voltage across capacitor 288. The low pass filter is coupled to the cathode of another 1N5711 detector diode 286 poled to provide a positive DC voltage across capacitor 290. The voltages across capacitors 288 and 290 are summed at point 292 by way of two ten-megohm resistors 294 and 296 which, in combination with the high back-to-front resistance ratio of the Schottky type diodes used as detectors, provide a long time constant circuit for maintaining the output voltage at point 292 substantially constant during the interpulse intervals. The high and low pass filters are tuned by capacitors 276 and 278 to provide overlapping passbands 303 and 305 as shown in FIG. 8A. The rectified output waveforms 307 and 309 from the detector diodes are shown in FIG. 8B. The sum of these voltages appearing at point 292 is shown in FIG. 8C. The waveform 311 shown in FIG. 8C is applied to the input of the operational amplifiers 298 and 300 which are selected for their ability to operate at high input impedance levels without significant drift in gain and to provide the high gain required to produce on line 382 the output waveform shown in FIG. 8D. As seen, the waveform has a wide capture range corresponding to the broad flat skirts 313 and 315 above and below crossover and a high voltage-to-frequency ratio corresponding to a steep slope at crossover. This circuit thus provides in a novel manner means for stretching the pulsed input signals and for locking the AFC loop over a wide range of input frequencies without the use of a search and lock circuit.

Figure 9:
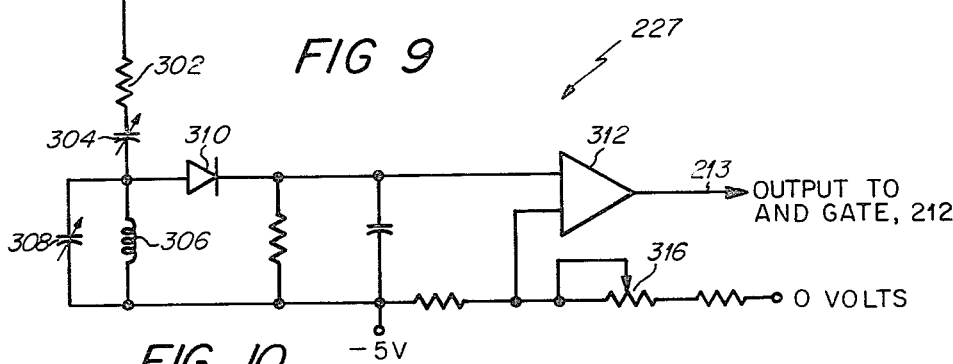
FIG. 9 is a schematic diagram of the "On Frequency" circuit shown in FIG. 3.

Referring to FIG. 9, in connection with FIG. 3, there is shown an "On-Frequency" circuit 227 which assures that the AND gate 212 of FIG. 3 is turned on to activate the performance monitor response circuit only when the IF frequency from the limiting amplifier 221 in the AFC loop is locked in at the frequency of the IF oscillator 238 which generates the response signal.

As the radar antenna rotates, the performance monitor AFC locks in and unlocks with every revolution, being locked only when the radar antenna beam is directed at the performance monitor antenna. When the performance monitor 200 receives a signal from the radar antenna 101, a finite number of pulses are required befor AFC lock-in occurs. Normally, the signal from detector 208 of FIG. 3 exceeds the threshold level established by the threshold circuit 210 and provides an input on lead 211 to AND gate 212 before the AFC loop is locked in. It is desirable that the performance monitor avoid responding before the AFC loop is locked in to the frequency corresponding to the output frequency of IF oscillator 238 since the response frequency of the monitor would otherwise not be at the frequency of the radar transmitter. For those radars which have manually tuned receivers, the result would be that the radar receiver could be tuned to these incorrect response signals producing a spurious response at the leading and trailing edges of the wedge-shaped response pattern 174 on the radar display 173 shown in FIGS. 2 and 5. This tends to make tuning somewhat difficult due to the undesirable signals at these edges of the pattern before the center of the pattern becomes visible to indicate precise tuning to the radar transmitter frequency. Furthermore, in the event that the radar performance monitor AFC circuit malfunctions, the "On-Frequency" circuit prevents the monitor from responding at incorrect frequencies.

Referring to FIG. 9, in particular, the "On-Frequency" circuit operates as follows. An IF signal from limiting amplifier 221 in the AFC loop is coupled through resistor 302 and capacitor 304 to a parallel resonant circuit consisting of inductor 306 and capacitor 308 which is tuned to adjust the resonant frequency to the frequency of the IF oscillator 238. When the input frequency is at the resonant frequency of the above parallel resonant circuit, an IF signal appears at the diode 310 which rectifies this signal to produce a DC control signal at one input of comparator circuit 312, the other input being a reference voltage adjusted to the desired sensitivity by voltage divider potentiometer 316, in a well-known manner. The output of comparator circuit 312 provides an input on line 213 to AND gate 212 when the AFC circuit is locked on to provide the correct output frequency from the performance monitor.

In operation, referring in particular to FIG. 3, the performance monitor 200 is generally located in close proximity to radar antenna 101, which is normally mounted near the top of a mast for maximum unobstructed radar visibility, to provide coupling through space between radar antenna 101 and performance monitor antenna 202. When the radar operator wishes to check the performance of the radar, the radar performance monitor is actuated by closing a switch (not shown) which connects the voltage from a power supply (not shown) to the performance monitor. When the radar transmitter output power and the radar receiver sensitivity and tuning are within preset limits, the characteristic pattern 174 of bright arcs 175 appears on the radar display 173 as shown in FIGS. 2 and 5. In the event that the entire pattern 174 is weak or not visible, the operator tunes the receive of a manually tunable radar, in a known manner, to produce a pattern of maximum brightness. If the characteristic response pattern cannot be obtained, the radar performance has fallen below the preset limits.

At the time of initial installation of the performance monitor, it is necessary to perform a calibration to establish and preset acceptable levels of radar performance. For example, the radar transmitter power can be permitted to decrease by five dB and the radar receiver sensitivity to signals at the transmitter frequency, including the effects of tuning, can be permitted to decline by ten dB from their desired levels, these two criteria being used as standards of acceptable operation, below which the response pattern from the performance monitor will disappear. This performance calibration is accomplished in the following manner.

When the radar is operating at its normal level of performance, at the time when it has been installed and adjusted to meet predetermined standards or at a subsequent time when it has been restored to normal operation, by criteria independent of the performance monitor, the performance monitor threshold level and response level are adjusted using calibration and control circuitry which is generally located adjacent to the radar receiver-transmitter. This circuitry 330 is shown in FIG. 3. For calibration, switch 331 is set to the calibrate position and potentiometer 334 is set initially at a position which produces maximum output from amplifier 242 by means of a voltage divider potentiometer 334 connected to sources of voltage at the terminals 336 and 338. Potentiometer 340, which sets the gain of an amplifier preceding a well-known voltage comparator in the threshold circuit, is adjusted until the threshold level is just at the point of no longer initiating a response from the performance monitor, at which time the characteristic response pattern 174 on the radar display 173 disappears. Switch 331 is then returned to the operate position, which changes the reference voltage at a comparator in the threshold circuit 210 so as to lower the threshold by five dB, thus causing the response pattern 174 to appear at full brightness. Switch 332 is then set to the calibrate position and potentiometer 334 is adjusted to reduce the gain of amplifier 242 so as to reduce the strength of the response signal 174 on the radar display screen 173 until the signal is no longer visible. The switch 332 is then returned to the operate position, producing a ten dB increase in the gain of IF amplifier 240 and restoring the response pattern to full brightness. This completes the calibration procedure.

If the radar transmitter declines in power output by five dB or more, the performance monitor response will not be initiated and the response pattern 174 on the radar display 173 will not appear. If the radar receiver sensitivity declines by ten dB or if the receiver is equivalently detuned, the response pattern 174 on the radar display 173 decreases in brilliance until it is no longer visible. In either case, the disappearance of the response pattern signifies that the radar performance is below the preset limit of acceptability.

Figure 10:
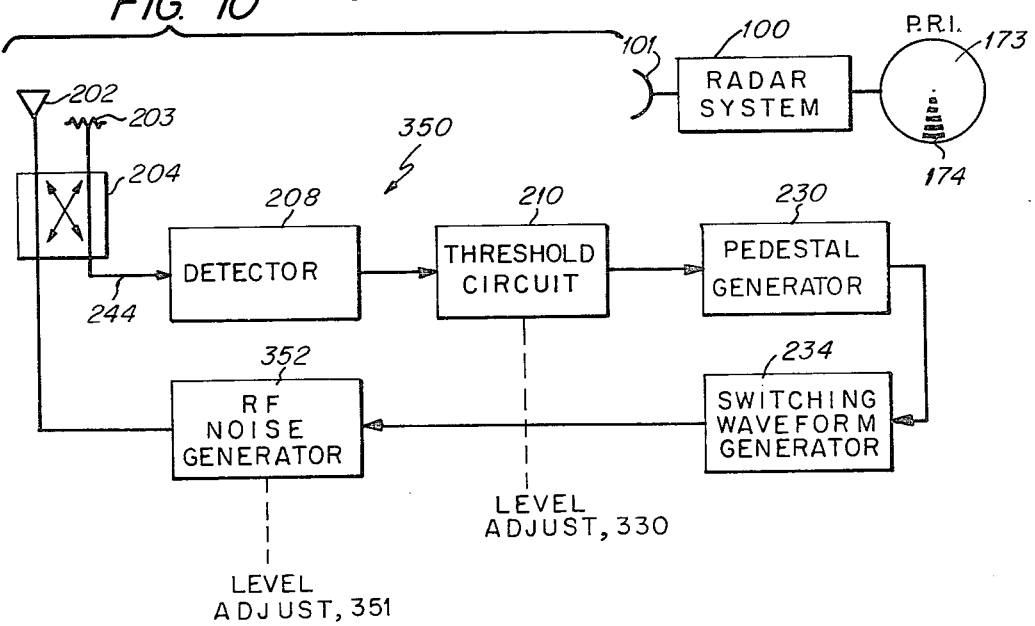
FIG. 10 is a schematic diagram of a performance monitor utilizing a noise generator as the RF source of response signals.

FIG. 10 shows an alternative embodiment of the invention in which a noise source is used to generate a response signal which produces a distinctive pattern on the radar display device, the test pattern being used to monitor the radar's transmitter power level and receiver sensitivity. It should be understood that this embodiment does not monitor radar receiver tuning, since the noise band extends over a wide frequency range to permit receiver sensitivity to be tested without confining the response signal to the particular frequency of the receiver.

In particular, FIG. 10 shows a radar system 100 having an antenna 101 which radiates pulses of RF energy into space. A portion of this energy couples to antenna 202 of performance monitor 350.

Previously described directional coupler 204 having its auxiliary arm terminated in a well-known matched load 203 is used in the present embodiment to couple a sample of the RF signal through its auxiliary arm 244 to detector 208 previously described. The DC output of detector 208 is fed to adjustable threshold circuit 210, previously described, which sets the level at which an output signal is produced to trigger pedestal generator 230. The threshold level is adjusted remotely by calibration control 330, as previously described. The output of pedestal generator 230 actuates switching waveform generator 234 for a duration of, for example, 244 microseconds, which corresponds to the desired duration of the monitor response signal. When so actuated, the switching waveform generator 234 produces a square wave output, in the manner of output 237 of FIG. 3. This output actuates a noise generator 352 utilizing in this embodiment a solid state noise diode (not shown) which is turned on and off to produce a wide band RF output signal which is fed directly by way of directional coupler 204 to antenna 202. The level of this RF response signal is set by a level adjust circuit 351 during calibration, as described above. It should be understood that a conventional noise diode can be used, provided that, instead of coupling its output to antenna 202, its output is coupled to the radar by way of a conventional coupler (not shown) inserted in the transmission line which connects radar antenna 101 to the radar receiver of radar system 100. In the present circuit, a noise diode having a relatively high RF output level is used to permit coupling the return signal through space.

Figure 11B:
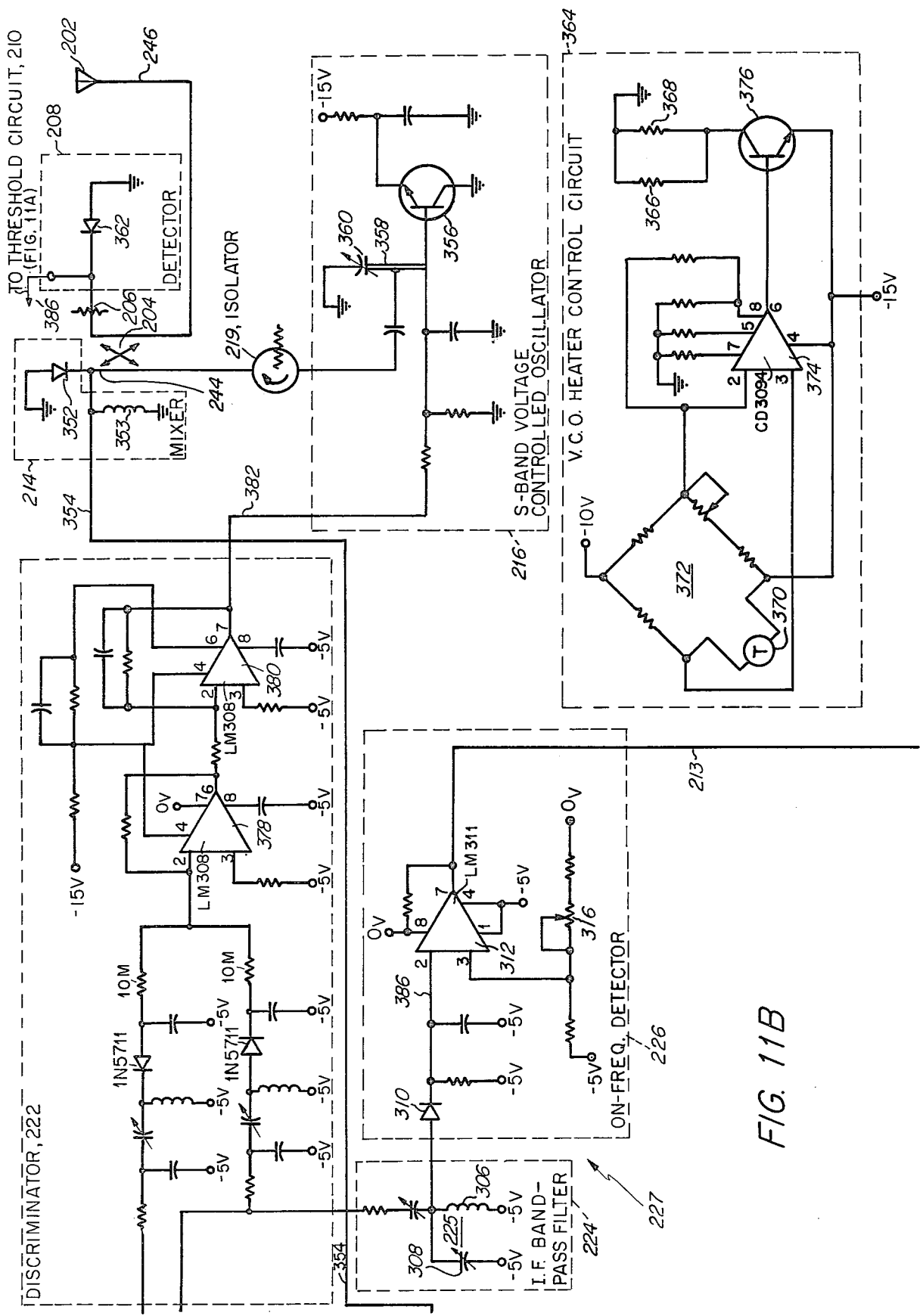

Referring to FIG. 11, there is shown a detailed schematic diagram of the performance monitor in which corresponding parts have the same numerals as in the previous Figures. In the receive mode, antenna 202 of FIG. 11B picks up a sample of the transmitted signal from an associated radar and couples the signal through directional coupler 204 and attenuator 206 to detector 208. Diode 362 of detector 208 rectifies the sample and provides an output signal on line 386 to the threshold circuit 210 during the receive mode of the monitor. It should be understood that antenna 202 is preferably a printed circuit antenna mounted outside a metallic housing (not shown) which contains the performance monitor printed circuit boards and protected by a radome (not shown) which is transparent to microwave frequencies. The antenna 202 can be a dual frequency antenna adapted for use at both S-band and X-band or separate antennas adapted for use at a single frequency band can be used.

The auxiliary arm of directional coupler 204 supplies a portion of the signal from the antenna 202 to mixer 214 in which it is mixed with a local oscillator signal from S-band voltage controlled oscillator 216 when the radar signal 245 is at S-band, as shown in FIG. 4, or with the third harmonic of the local oscillator signal when the radar signal 247 is at X-band, as shown in FIG. 4. This third harmonic is generated in mixer 214. Mixer 214 contains a single diode 352, preferably a Schottky barrier diode, which is provided with a DC return to ground through inductor 353. The incoming radar sample and the signal from local oscillator 216 are mixed in diode 271 to produce an IF output on lead 354 to terminal 270, of FIG. 11A.

The S-band voltage controlled local oscillator 216 utilizes a high frequency transistor 356 in a printed circuit microstrip arrangement in which the center frequency is determined by the length of a resonant transmission line section 358, tuned by variable capacitor 360 in a well-known manner. The frequency can be varied electronically by a voltage from the AFC loop, previously described, applied to the base of the transistor 356 to modify the frequency of the local oscillator to achieve lock of the AFC loop.

Isolator 219 isolates the local oscillator from any adverse effect due to the impedance mismatch of mixer 214, which mismatch tends to be abruptly increased when the radar sample is applied to the mixer diode. It should be understood that isolator 219 can be a well-known nonreciprocal ferrite isolator or it can be an "active isolator" comprising one or more stages of amplification, preferably using semiconductor amplifiers, the stages of which are preceded by well-known resistive attenuators selected to have an attenuation approximately equal to the gain of the following amplifiers to provide a forward gain of approximately unity and substantial isolation in the reverse direction. This active isolator provides no insertion loss, and even an appreciable insertion gain, where desired, to provide increased local oscillator output. It does not require a permanent magnet and can be used in the presence of magnetic fields. It is also adapted to printed circuit board construction using conventional techniques. To insure that inherently temperature sensitive transistor 356 is protected from a wide range of ambient temperatures which could cause the AFC loop to become unlocked, a heater control circuit 364 is used to sense the temperature of the circuit board close to the transistor and to regulate a pair of heater resistors 366 and 368 in a well-known manner in conjunction with a thermistor temperature sensor 370 in a well-known bridge circuit 372 by way of a conventional DC amplifier 374 controlling the conduction of heater control transistor 376.

The IF output from mixer 214 is passed through a field effect transistor 378 in FIG. 11A operating as a switch 217 to prevent the performance monitor response signal, which is at terminal 270 during the response mode of the monitor, from entering the IF amplifiers 218, 220 and 221 and capturing the AFC loop, causing a lock on the monitor IF response signal frequency rather than on the IF signal corresponding to the incoming radar transmitter signal. In the receive mode of the monitor, the output from FET switch 217 is amplified by dual channel IF amplifiers 218, 220 and 221 which feed discriminator 222 of FIG. 11B. Amplifiers 218, 220 and 221 have sufficient gain to saturate amplifier 221, thereby making the operation of the discriminator 222 dependent only on the frequency of the signal into amplifier 218 and not on its amplitude, as is well known.

Discriminator 222, as previously described, provides an output voltage which is a function of the frequency, having a steep crossover slope corresponding to a large voltage-to-frequency ratio so as to maintain the frequency of the local oscillator 216 at the crossover frequency of the discriminator to a high degree of accuracy, thereby assuring that the performance monitor response signal is maintained at the frequency of the incoming radar transmitter sample, inasmuch as the IF response source 238 is factory tuned to the crossover frequency of the discriminator.

Figure 8D:
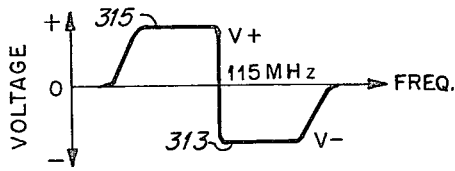

To provide a capability for locking the AFC loop over a wide range of input frequencies corresponding to the full range over which marine radar magnetrons operate, two stages of amplification 378 and 380 are used at the output of the discriminator, the final stage 380 being driven to operate in saturation to provide broad flat skirts 313 and 315 in the overall response characteristic of the discriminator, as shown in FIG. 8D.

The DC output of discriminator 222 on line 382 is fed back to the S-band voltage controlled oscillator 216 to close the AFC loop, thus maintaining the S-band oscillator at a frequency at which, when it is mixed with the incoming radar sample, the resulting IF signal is at the crossover frequency of the discriminator 222. This is substantially equal to the frequency of the IF oscillator 238 so that the response of the performance monitor is at the frequency of the radar transmitter, as required in order to be able to accurately monitor the tuning of the radar receiver.

A sample of the signal from the limiting amplifier 221 which feeds the discriminator is taken off to an "On-Frequency" circuit, previously described, the purpose of which is to permit the monitor to transmit a response signal, by providing an input signal to AND gate 212 on line 213, only when the AFC loop has locked the local oscillator 216 to the required frequency. To achieve this, a bandpass filter 224 having a resonant circuit 225 consisting of the inductor 306 and the tunable capacitor 308 is tuned to resonate at the frequency of the IF oscillator 238 so that only signals at that particular frequency are coupled to diode 310 to produce a rectified signal on line 386 connected to the comparator 312. This comparator sets the sensitivity of the "On-Frequency" circuit by comparing the signal on line 386 with a reference voltage from voltage divider potentiometer 316. The sensitivity is preferably adjusted in a well-known manner to make the frequency tolerance substantially equal to the bandwidth of the receiver in the associated radar. The output of comparator 312 is connected to AND gate 212 of FIG. 11D by line 213 to provide a signal which, in conjunction with an input from threshold circuit 210 on line 211, actuates AND gate 212 to initiate a monitor response signal.

Threshold circuit 210 of FIG. 11A receives an input signal from detector 208 on line 386. This signal is applied to video amplifier 388, the gain of which is regulated by varying the effective resistance of gate 390 by adjusting the voltage on its control electrode by means of potentiometer 340. The output of video amplifier 388 is fed to voltage comparator 392 for comparison with a threshold reference voltage determined by voltage divider 394 and 396 in conjunction with potentiometer 398 and calibrate-operate switch 331. Potentiometer 398 is used to set the size of a step in threshold level, for example five dB, introduced during calibration. This step occurs when a −5V source is connected to potentiometer 398 by closing switch 331, increasing the threshold level above which an output appears on line 211. This permits, after calibration as previously described, a degradation of, for example, five dB in transmitter output from the associated radar before the distinctive pattern 174, on the radar display 173, disappears, providing a fault indication to the operator. It should be understood the circuitry 400 is a well-known integration circuit used to provide a test voltage proportional to the strength of the RF signal from the radar. During installation of the performance monitor, this test voltage provides a convenient DC signal for indication on a suitable indicator (not shown).

When AND gates 212 and 228 receive signals simultaneously on lines 211, 213 and 229, an output on line 426 is provided to trigger the pedestal generator 230 which uses a conventional integrated circit 231 to provide a 244-microsecond pedestal output corresponding to the desired duration of the monitor response signal. Three separate outputs of the pedestal generator 230, with waveform 232 of FIG. 3, supply a switching signal on line 404 to FET switch 217, a gain control signal on line 406 by way of gate 402 to IF amplifiers 218, 220 and 221, and an actuating signal on line 233 to switching waveform generator 234. Switching waveform generator 234 uses an integrated circuit 410 to produce a series of pulses forming a square wave output, shown as waveform 237 in FIG. 3, corresponding to the bars 175 of the distinctive pattern 174 to be produced on the radar screens 173 of FIGS. 2 and 5. These pulses gate the IF oscillator 238 on and off by way of line 412 and gate 414. The IF oscillator includes an integrated circuit package 416, a potentiometer 413 which sets the gating level, and a resonant circuit 418 which is adjusted to set the frequency of oscillation to the desired operating frequency, for example 115 megahertz. It should be understood that the crossover frequency of the discriminator 222 and the frequency of the "On-Frequency" circuit 227 are adusted to the frequency of IF oscillator 238 to assure that the monitor RF response frequency is at the frequency of the associated radar transmitter.

The IF oscillator 238 produces a train of IF pulses which are amplified by well-known amplifiers 240 and 242 which include field effect transistors 415 and 417, respectively. Variable capacitors 419 and 421 are adjusted in conjunction with their associated inductors to set the center of the IF bandpass to the frequency of IF oscillator 238.

In order to permit calibration of the output signal strength of the performance monitor, IF amplifier 240 is provided with means of introducing an adjustable step in gain, controlled by potentiometer 420 and switch 332 to be, for example, ten dB; that is, the gain is ten dB higher when switch 332 is in the operate position that when it is in the calibrate position. This corresponds to the degradation in radar receiver sensitivity, for example ten dB, which is selected as a limit for satisfactory operation. A continuous adjustement in the monitor output signal strength is provided by a gain control applied to amplifier 242 using potentiometer 334 in a voltage divider network 426, 428.

Calibration of the level of the output signal on line 423 is achieved by first setting the switch 332 in the calibrate position and adjusting potentiometer 334 until the monitor response signal 174 on the radar display 173 in FIGS. 2 and 5 is barely visible and then setting switch 332 to the operate position which increases the gain of the amplifier 240 by a step of, for example, ten dB. In the event that radar receiver sensitivity or performance deteriorates by more than the selected ten dB, the pattern on the radar screen disappears, indicating to the operator that the performance of the radar has degraded below the selected limit for satisfactory operation.

Figure 12:
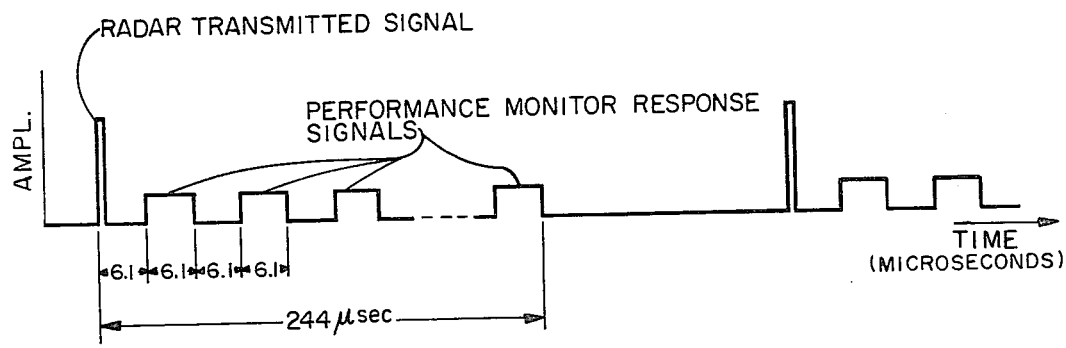
FIG. 12 is a timing diagram of the radar performance monitor response signals.

The IF signal on line 423 is coupled at junction point 270 to line 354 and thence to the IF input-output circuit of mixer 214 where it mixes with the RF signal from the local oscillator 216 and also with the third harmonic of the local oscillator signal generated in the mixer diode 271. This mixing process produces an RF sideband at the frequency of the radar transmitter regardless of whether that frequency is at S-band or at X-band. This RF sideband is coupled by way of line 244 through directional coupler 204 antenna 202 and radiated as a response signal to the radar antenna. Whether the radar is receiving at S-band or X-band, the distinctive pattern 174 appears on the radar display 173 of FIGS. 2 and 5 indicating that the performance of both radar and monitor are satisfactory. FIG. 12 shows the time relationships between the radar transmitted signal and the performance monitor response signals. In the event that the distinctive pattern 174 fails to appear on the radar display 173 when the radar operator actuates the performance monitor, the operator is made aware of a possible malfunction in the radar or in the performance monitor.

Figure 11C:
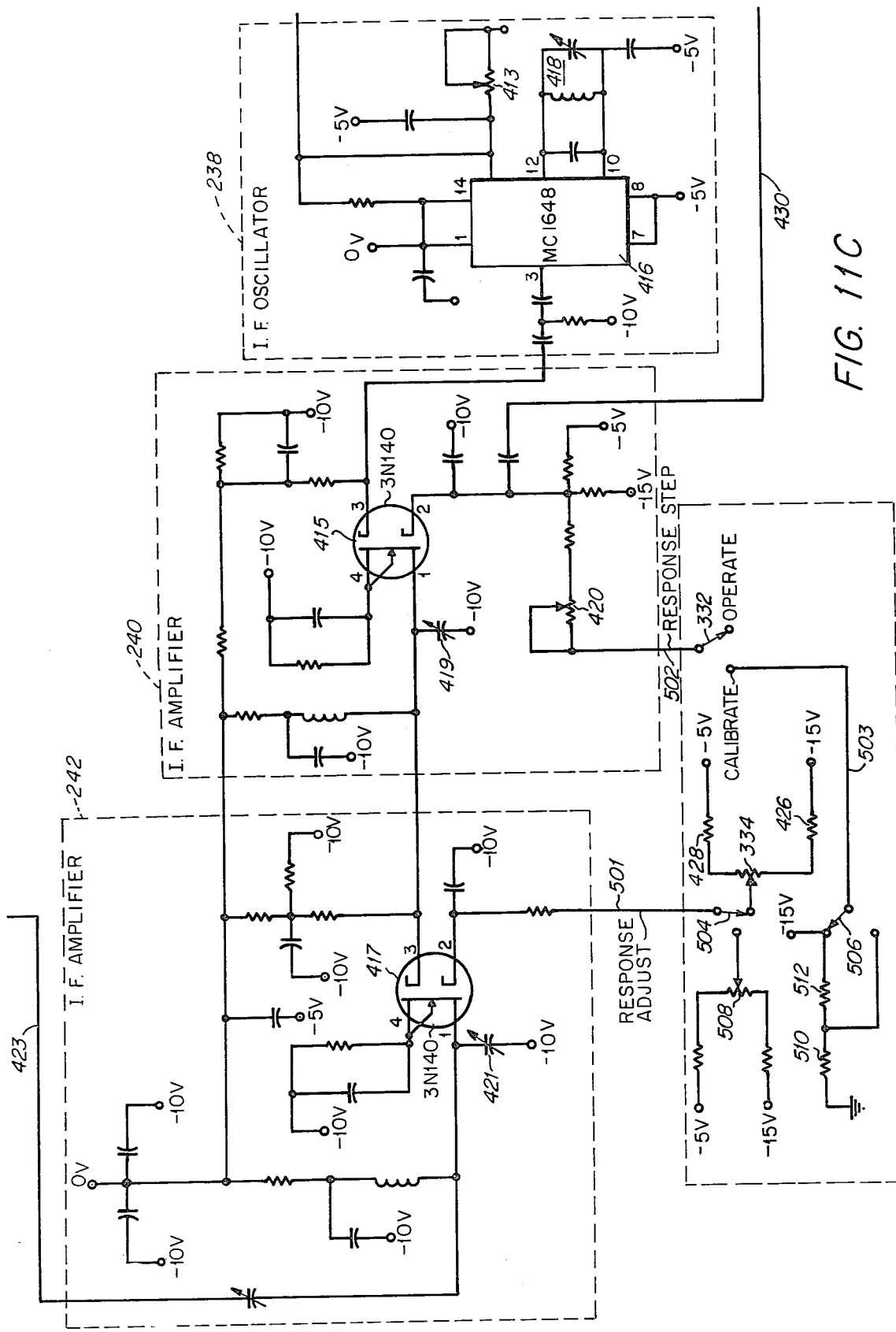
Figure 11D:
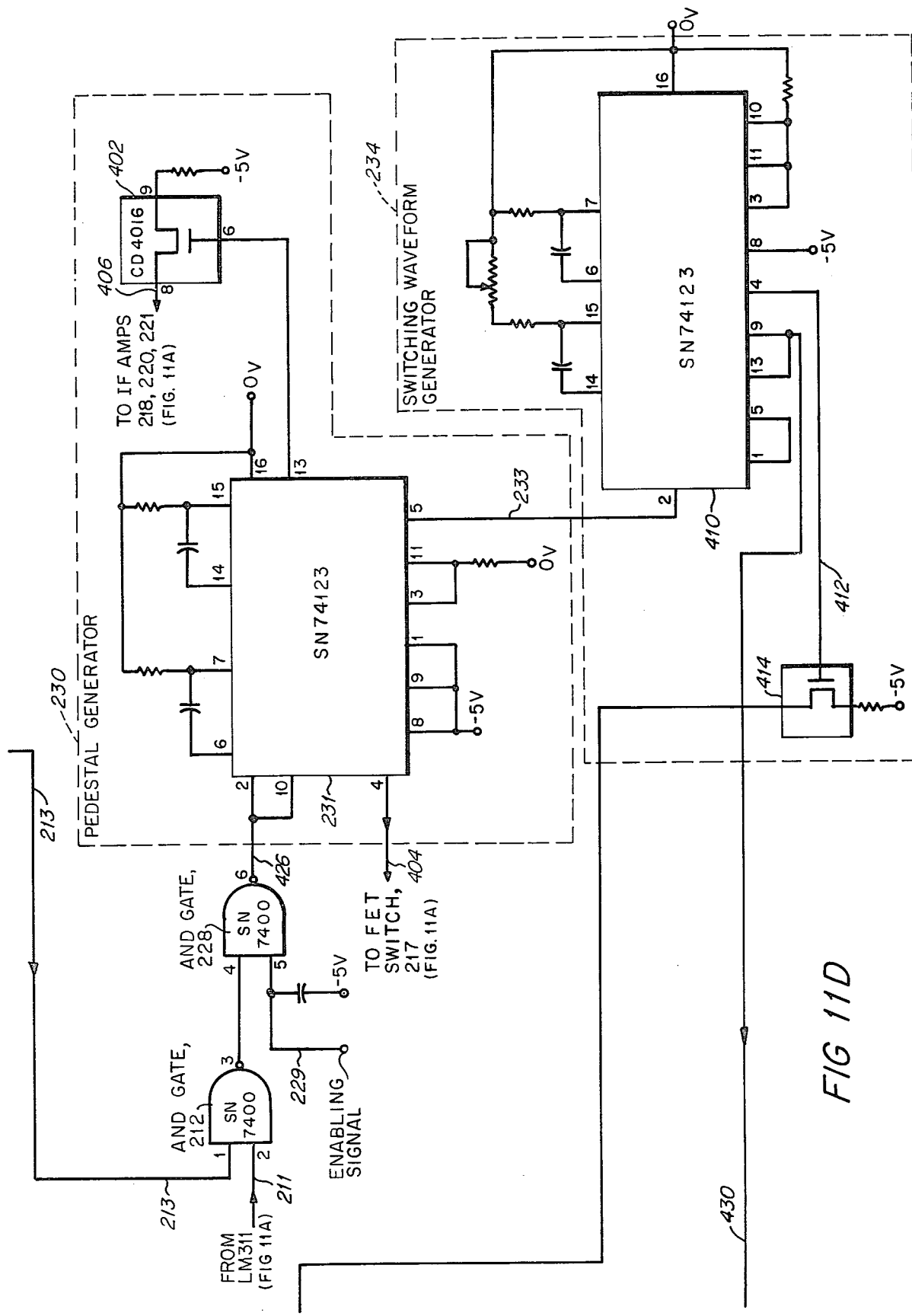

Referring again to the calibration circuity of FIG. 11C and, in particular, the response adjust circuitry connected to line 501 and the response step circuitry connected to line 502, a modification of the calibration circuit is shown in which means have been added to permit calibration for monitoring of a reduction in radar sensitivity by a smaller increment than ten dB. This added calibration is for use generally with radars having an automatic tracking option in which for safety it is preferred to have an indication of small changes in sensitivity, for example, a degradation of five dB, when operating in this automatic or so-called "night watch" mode. In this mode, an alarm signal is given when conditions occur which require the attention of an operator or whenever radar performance degrades by a preset amount, for example, five dB.

To set the calibration for such automatic or "night watch" mode of operation, switch 504 is set to connect line 501 to potentiometer 508 and switch 506 is set to connect line 503 to the junction of voltage divider resistors 510 and 512. Switches 504 and 506 are preferably ganged to facilitate switching from the normal to the automatic mode of operation. The level of the output signal on line 423 is then calibrated by first setting the switch 332 to the calibrate position and adjusting potentiometer 508 until the monitor response signal barely exceeds the level required by the radar in the automatic mode of operation to indicate satisfactory performance. In radars using two or more quantized video steps, this level is generally the level corresponding to the second video threshold. Inasmuch as the second video threshold is commonly six to ten dB above the first threshold, which sets the minimum level for visibility on the PPI, the performance monitor response signal strength required for a radar operating in this automatic mode is correspondingly larger than that required for normal operation, wherein only the minimum level for visibility must be exceeded. When potentiometer 508 has been set so that the signal 174 just exceeds the second video threshold, switch 332 is returned to to the operate position, increasing the gain of IF amplifier 240 by a step of, for example, five dB. This gain increase is achieved by changing the bias on FET 415 to increase the amplification. This completes the calibration of the performance monitor for operation with a radar in the optional automatic track mode. The sensitivity of the radar, including the effects of tuning, must now degrade by five dB in order for the quantized video signal to drop from the second level to the first level, thereby producing an alarm signal. The response signal on the radar PPI is still visible at the first level so the operator can evaluate the monitor response signal and the signals from real targets and can switch from "night watch" to normal operation until the radar's normal sensitivity can be restored.

Referring now to FIG. 11A, in order to prevent the performance monitor IF response signal at junction 270, coupled through line 424, from entering the AFC loop, switching circuit 217 containing FET 378 is turned off during the monitor response time by an output from the pedestal generator 230 on line 404. At the same time, a gain reduction signal from the pedestal generator 230 on line 406 is applied to IF amplifiers 218, 220 and 221. This provides positive assurance that a portion of the monitor IF response signal does not enter the discriminator 222 and adversely affect the operation of the AFC loop. This is particularly desirable because the monitor IF response signal is a series of 6.1-microsecond pulses lasting for 244 microseconds following every received pulse from radar system 100 whereas the desired IF signal is derived from the received pulse from radar system 100 which has a duration of only, for example, 0.5 or 1.0 microsecond. During the time when the radar signal is received by the performance monitor, switch 217 is turned on by the absence of a signal on line 404 and the IF amplifiers 218, 220 and 221 are at full gain in the absence of a gain reduction signal on line 406. Therefore, the IF signal corresponding to the received sample of the radar transmitter pulse is of sufficient strength at the input to the discriminator 222 to lock the AFC loop at the 115-megacycle discriminator crossover point.

In order to prevent undesirable oscillation which might develop as a result of stray feedback between IF amplifiers 218, 220 and 221 in the AFC loop and IF response amplifiers 240 and 242, it is desirable to provide means for preventing all the above amplifiers from being at full gain simultaneously. This is done by providing a gain reduction signal from switching waveform generator 410 on line 430 of FIG. 11D. This signal is applied only to amplifier 240 of FIG. 11C and FIG. 3 to reduce its gain except during each of the 6.1-microsecond pulses making up the pulse train 237. Since a gain reduction signal is applied to IF amplifiers 218, 220, and 221 during this entire pulse train, as previously described, there is never a time when all five IF amplifiers are at full gain simultaneously.

This completes the description of the embodiments of the invention illustrated herein. However, many modifications thereof will be apparent to persons skilled in the art without departing from the spirit and scope of this invention. Accordingly, it is intended that the invention be not limited to the particular details of the embodiments described herein except as defined by the appended claims.

What is claimed is:

1. A radar performance monitor adapted to be mounted near a radar antenna so as to couple to the radar in space, comprising means for receiving a radio frequency sample being coupled to a detector to produce a detected sample, said monitor being adapted to generate a response signal at the frequency of the transmitter of said radar in response to said detected sample being above a predetermined threshold level, means for transmitting said response signal back to said radar antenna, said response signal producing during operational use of the radar a distinctive test pattern, readily distinguishable from normal radar target returns, upon the display of said radar as long as said radar maintains a predetermined level of sensitivity to signals at the transmitted frequency.

2. The performance monitor of claim 1 in which said distinctive test pattern comprises a series of arcs having a predetermined width and separation in range and extending from a first to a second predetermined range limit on said display, the azimuth width of said pattern being determined by the radiation pattern of said radar antenna.

3. The radar performance monitor of claim 1 which includes a directional coupler, mixer and detector adapted to be simultaneously operable at two frequencies having a ratio of substantially three to one without being operable to process signals at frequencies therebetween.

4. The radar performance monitor of claim 1 adapted to be simultaneously operable at two frequencies without being operable to process signals at frequencies therebetween.

5. A performance monitor for use with a radar comprising means for receiving a transmitted pulse from said radar, means for detecting a sample of said transmitted pulse to provide a detected output signal, means fed by said detected output signal for providing a threshold above which a threshold output signal is provided, a directional coupler coupled to said receiving means, an AFC loop including a local oscillator, said directional coupler, a mixer, and a broadband IF discriminator adapted to capture an intermediate frequency output signal from said mixer, said broadband discriminator including low-Q single tuned circuitry, gating means fed by a signal derived from an intermediate frequency signal in said AFC loop and by said threshold output signal to provide a control signal, and means in response to said control signal to provide a distincttive pulse pattern readily distinguishable from normal radar target returns for transmission by way of said directional coupler to said radar, said radar including a display circuit for displaying said distinctive pulse pattern from said radar performance monitor simultaneously with the display of normal radar target returns.

6. A radar performance monitor in accordance with claim 5 in which the duration of said predetermined pulse pattern is extended to correspond to a range on the display of said radar of at least ten miles and is limited to a range determined by the repetition rate of said radar so as to avoid the appearance of second-time-around responses on the display of said radar.

7. A radar performance monitor adapted for use with a radar comprising an antenna, means connected to said antenna for detecting a radio frequency sample of a transmitted signal from said radar, said detected sample coupled to means for setting a predetermined threshold above which a threshold output control signal is provided, and means including an automatic frequency control loop comprising a mixer in which a portion of said radio frequency sample is mixed with the RF output of a local oscillator so that said mixer operates as a downconverter to convert said radio frequency sample to an IF frequency, said IF frequency being coupled in a receiving mode of operation to an IF amplifier and an IF discriminator including a direct current amplifier coupled to said local oscillator so as to regulate the frequency of said local oscillator, said IF discriminator including a high frequency filter and a low frequency filter having parallel LC circuits so tuned that their frequency passbands overlap each other, the capacitors associated with said LC circuits being connected in a shunt-series circuit adapted to transform the output impedance of an amplifier driving said LC circuits from a relatively low value up to the higher value which is necessary for the required value of Q of said LC circuits, detectors of opposite polarity connected to the outputs of said filters, the outputs of said detectors being connected together to provide a single output signal, said output signal driving said direct current amplifier, a signal from the output of said IF amplifier being coupled through an "On-Frequency" detector circuit to one input of an "AND" gate, the other input of said "AND" gate being provided by said control signal, the output of said "AND" gate in a transmitting mode actuating an IF oscillator to provide a predetermined pattern of pulses, said pattern being adapted to produce on the display of said radar a distinctive display pattern readily distinguishable during operational use from normal radar target returns, said IF pulses being coupled to said mixer for mixing with the output signal of said local oscillator so that said mixer operates as an unconverter to produce a corresponding distinctive pattern of RF pulses for transmission by way of said antenna to said radar.

8. A radar performance monitor adapted for use with a radar comprising an antenna, means connected to said antenna for detecting a radio frequency sample of the transmitted signal of said radar, said detected sample coupled to means for setting a predetermined threshold above which a threshold output control signal is provided, means including an automatic frequency control loop comprising a mixer, an IF amplifier and an IF discriminator coupled to a direct current amplifier and local oscillator for regulating the frequency of said local oscillator, said IF discriminator including a high frequency filter and a low frequency filter having parallel LC circuits so tuned that their frequency passbands overlap each other, capacitors associated with said LC circuits being connected in a shunt-series circuit adapted to transform the output impedance of an amplifier driving said LC circuits from a relatively low value up to a higher value which is necessary for the required value of Q of said LC circuits to provide broadband operation, detectors of opposite polarity connected to the outputs of said filters, the outputs of said detectors being connected together to provide a single output signal, said output signal driving said direct current amplifier, said detectors having a high back-to-front resistance ratio and said direct current amplifier being adapted to be driven by a high impedance circuit, said detectors acting in combination with said direct current amplifier to provide pulse stretching, producing an effective high gain for pulsed signals as required for a response curve with broad skirts above and below the cross-over frequency of said discriminator, thereby eliminating the usual requirement for a search and lock circuit; said threshold output control signal actuating an IF oscillator to produce a pattern of IF pulses, and means for converting said IF pulses to RF pulses for transmission to said radar.

9. A discriminator for use with a performance monitor adapted to operate with a pulsed input, comprising a direct current amplifier, a high frequency filter and a low frequency filter having parallel LC circuits so tuned that their frequency passbands overlap each other, capacitors associated with said LC circuits being connected in a shunt-series circuit adapted to transform the output impedance of a driving circuit for said high and low frequency filters from a relatively low value to a higher value to provide a required value of Q of said LC circuits to provide broadband operation, detectors of opposite polarity of a type having a low forward resistance and a high back-to-front resistance ratio to provide pulse stretching connected to the outputs of said filters, the output of said diodes being connected together to provide a single output signal, said output signal driving said direct current amplifier adapted to be driven by a high impedance circuit to provide a long time constant for maintaining said output signal substantially constant during intervals between pulses, said direct current amplifier providing a gain and saturation characteristic such that said discriminator and amplifier combination combined have a response curve with broad skirts above and below the cross-over frequency, thereby eliminating the usual requirement for a search and lock circuit.

10. A dual frequency microwave circuit for use in a performance monitor comprising a directional coupler, a mixer and a detector, said directional coupler including a main transmission line and an adjacent auxiliary transmission line, the width of the gap between said main and auxiliary transmission lines determining the value of coupling and the length of said gap determining the frequency of operation of said coupler, said length being an odd number of quarter wavelengths at the operating frequency, said length being selected to be one quarter wavelength at a first frequency and three-quarter wavelengths at a second frequency, said second frequency being substantially three times said first frequency so that said coupler is simultaneously operable at both of said frequencies without being operable at frequencies therebetween, said mixer and said detector each including a diode and dual frequency RF choke comprising a high impedance transmission line and a low impedance transmission line, each of said transmission lines having an effective length of an odd number of quarter wavelengths, said effective lengths being one-quarter wavelength at said first frequency and three-quarter at said second frequency, so that said mixer and detector are simultaneously operable at both of said frequencies without being operable at frequencies therebetween.

* * * * *

UNITED STATES PATENT OFFICE
CERTIFICATE OF CORRECTION

Patent No. 4,145,692           Dated   March 20, 1979

Inventor(s)   David G. Armstrong et al

It is certified that error appears in the above-identified patent and that said Letters Patent are hereby corrected as shown below:

Front page drawing
and FIG. 3:    Interchange 211 and 213 at the input to AND gate 212.

Change "266" (below detector 208) to --386--.

FIG. 10:   Change "P.R.I." to --P.P.I.--

FIG. 11B:  Change "386" (in the ON-FREQUENCY DETECTOR) to --387--.

Change "352" (in the MIXER) to --268--.

Change "362" (in the DETECTOR) to --260--.

UNITED STATES PATENT OFFICE
CERTIFICATE OF CORRECTION

Patent No. 4,145,692                    Dated    March 20, 1979

Inventor(s)  David G. Armstrong et al

It is certified that error appears in the above-identified patent and that said Letters Patent are hereby corrected as shown below:

Column 1, Line 32:  Change "sue" to --use--.

Line 49:  After "however" insert --such--.

Column 2, Line 47:  After "S-band" insert --and--.

Column 5, Line 48:  Change "101" to --102--.

Column 6, Line 53:  After "MTR" insert --unit--.

Column 7, Line 61:  Change "to" to --be--.

Column 8, Line 17:  After "interference" insert --rejection--.

Line 67:  Change "market" to --marker--.

UNITED STATES PATENT OFFICE
CERTIFICATE OF CORRECTION

Patent No. 4,145,692             Dated   March 20, 1979

Inventor(s) David G. Armstrong et al

It is certified that error appears in the above-identified patent and that said Letters Patent are hereby corrected as shown below:

Column 13, Line 40:   Change "Impedance" to --impedance--.

Column 15, Line 13:   Change "receive" to --receiver--.

Column 19, Line 58:   Change "that" to --than--.

Line 62:   Change "adjustement" to --adjustment--.

Column 20, Line 20:   After "204" insert --to--.

Column 22, Line 50:   Change "distincttive" to --distinctive--.

Column 23, Line 34:   Change "unconverter" to --upconverter--.

Signed and Sealed this

Fifteenth Day of July 1980

[SEAL]

Attest:

SIDNEY A. DIAMOND

Attesting Officer   Commissioner of Patents and Trademarks